United States Patent
Ohashi et al.

(10) Patent No.: US 9,647,576 B2
(45) Date of Patent: May 9, 2017

(54) VIBRATION TYPE DRIVING APPARATUS, TWO-DIMENSIONAL DRIVING APPARATUS, IMAGE-BLUR CORRECTION APPARATUS, INTERCHANGEABLE LENS, IMAGE-PICKUP APPARATUS, AND AUTOMATIC STAGE

(71) Applicant: CANON KABUSHIKI KAISHA, Tokyo (JP)

(72) Inventors: Kaishi Ohashi, Tokyo (JP); Shinji Yamamoto, Yokohama-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/405,389

(22) PCT Filed: May 31, 2013

(86) PCT No.: PCT/JP2013/003451
§ 371 (c)(1),
(2) Date: Dec. 3, 2014

(87) PCT Pub. No.: WO2013/183267
PCT Pub. Date: Dec. 12, 2013

(65) Prior Publication Data
US 2015/0130956 A1 May 14, 2015

(30) Foreign Application Priority Data

Jun. 5, 2012 (JP) .................................. 2012-128283
Apr. 12, 2013 (JP) .................................. 2013-084115

(51) Int. Cl.
*H02N 2/02* (2006.01)
*G02B 27/64* (2006.01)
(Continued)

(52) U.S. Cl.
CPC ............. *H02N 2/028* (2013.01); *G02B 21/26* (2013.01); *G02B 27/64* (2013.01); *G02B 27/646* (2013.01);
(Continued)

(58) Field of Classification Search
CPC ...................................................... H02N 2/028
(Continued)

(56) References Cited

U.S. PATENT DOCUMENTS 6,188,161 B1 2/2001 Yoshida
7,084,550 B2 8/2006 Sasaki
(Continued)

FOREIGN PATENT DOCUMENTS

CN 2105699 U 5/1992
CN 1565042 A 1/2005
(Continued)

*Primary Examiner* — Derek Rosenau
(74) *Attorney, Agent, or Firm* — Canon U.S.A. Inc., IP Division

(57) ABSTRACT

A vibration type driving apparatus including:
a vibrator including an electro-mechanical energy conversion device; a driven body between the vibrator and a movable body and driven in a first direction by the vibrator; and a moving mechanism that allows the movable body to move in a second direction relative to the driven body, in which the second direction is a direction intersecting the first direction in a plane parallel to a plane where the vibrator and the driven body are in contact with each other.

20 Claims, 27 Drawing Sheets

(51) Int. Cl.
H02N 2/00 (2006.01)
G02B 21/26 (2006.01)
H02N 2/04 (2006.01)
H04N 5/232 (2006.01)

(52) U.S. Cl.
CPC ........... H02N 2/0015 (2013.01); H02N 2/026 (2013.01); H02N 2/04 (2013.01); H04N 5/23287 (2013.01)

(58) Field of Classification Search
USPC .................. 310/323.01, 323.02, 323.16, 328
See application file for complete search history.

(56) References Cited

U.S. PATENT DOCUMENTS

| | | | |
|---|---|---|---|
| 7,832,947 | B2 | 11/2010 | Takahashi |
| 2006/0043824 | A1 | 3/2006 | Sakano |
| 2008/0145042 | A1* | 6/2008 | Kawai ..................... G03B 5/00 396/55 |
| 2010/0148629 | A1 | 6/2010 | Bexell |
| 2010/0171392 | A1* | 7/2010 | Mukae ................ G02B 27/646 310/328 |
| 2011/0234050 | A1* | 9/2011 | Oda ..................... H02N 2/0015 310/323.16 |
| 2011/0317264 | A1 | 12/2011 | Matsumoto |
| 2012/0082445 | A1 | 4/2012 | Kuwano |

FOREIGN PATENT DOCUMENTS

| | | |
|---|---|---|
| CN | 101207343 A | 6/2008 |
| CN | 101373936 A | 2/2009 |
| JP | 2008-054459 A | 3/2008 |
| JP | 2008-172995 A | 7/2008 |
| JP | 2010-122403 A | 6/2010 |
| JP | 2012-44832 A | 3/2012 |
| JP | 2012-130231 A | 7/2012 |
| RU | 2091843 C1 | 9/1997 |
| WO | 2012/026079 A1 | 3/2012 |

* cited by examiner

[Fig. 14C]

VIBRATION TYPE DRIVING APPARATUS, TWO-DIMENSIONAL DRIVING APPARATUS, IMAGE-BLUR CORRECTION APPARATUS, INTERCHANGEABLE LENS, IMAGE-PICKUP APPARATUS, AND AUTOMATIC STAGE

TECHNICAL FIELD

The present invention relates to a vibration type driving apparatus as well as a two-dimensional driving apparatus, an image-blur correction apparatus, an interchangeable lens, and an image pickup apparatus, and an automatic stage including the same.

BACKGROUND ART

Great many vibration type driving apparatuses that excite vibrations in a vibrator to move a movable body that is in pressure-contact therewith have been proposed. They are positioned as important functional components particularly in optical devices which are required to operate accurately. An example thereof is a two-dimensional driving apparatus in which a plurality of linear-motion-type (a type capable of linearly moving a movable body) vibration type driving apparatuses are disposed, and the driving operations thereof are combined to allow two-dimensional movement of the movable body. Another example is an image-blur correction apparatus using this two-dimensional driving apparatus (see PTL 1).

However, the method of combining driving operations of a plurality of vibration type driving apparatuses has the following important problems to be solved.

For example, the moving direction of the movable body and the driving direction of some of the plurality of vibration type driving apparatuses sometimes intersect at right angles or at angles close to right angles depending on the moving direction of the movable body. In this case, not only the vibration type driving apparatus whose driving direction intersects the moving direction at right angles or angles close to right angles cannot contribute to driving but also a frictional force due to the contact between the movable body and the vibration type driving apparatus exerts a load on the movement of the movable body, causing an energy loss, which results in an output loss. This may cause a decrease in characteristics when used as, for example, a two-dimensional driving apparatus, an image-blur correction apparatus, an interchangeable lens, an image pickup apparatus, or an automatic stage.

To solve these problems, PTL 1 discloses a configuration having a moving mechanism (deflecting mechanism) that allows a vibrator to move in a direction (deflecting direction) intersecting the driving direction. This prevents the vibrator and the movable body from moving relative to each other in the deflecting direction. By forming the deflecting mechanism out of a guide mechanism having a remarkably small sliding loss or an elastic spring having low rigidity, a load that acts on the movable body can be made extremely small. This remarkably reduces the output loss.

CITATION LIST

Patent Literature

PTL 1: Japanese Patent Laid-Open No. 2012-44832

SUMMARY OF INVENTION

Technical Problem

However, the output-loss reduction unit for the vibration type driving apparatus, the two-dimensional driving apparatus, or the image-blur correction apparatus described above mainly has the following three problems in the operation of moving the vibrator in a deflecting direction (intersecting operation).

A first problem is that the vibration type driving apparatus requires an additional accelerating force and decelerating force due to the mass of the vibrator during acceleration and deceleration because the vibrator is also moved in addition to the movement of the movable body. These forces cause reduction in the force that acts on the movable body, thus causing a loss of the output to the movable body.

A second problem is that a power supply member for supplying power to the vibrator is moved together with the vibrator. For example, if the power supply member is a flexible printed board, there is a possibility that, for example, wires can be broken due to deformation.

A third problem is that a space in which the vibrator and the power supply member can move must be provided, thus increasing the size of the apparatus.

An aspect of the present invention relates to a vibration type driving apparatus, a two-dimensional driving apparatus, an image-blur correction apparatus, an inter-changeable lens, an image pickup apparatus, or an automatic stage in which the output loss can be reduced without causing the above three problems.

Solution to Problem

An aspect of the present invention relates to a vibration type driving apparatus including: a vibrator including an electro-mechanical energy conversion device; a driven body between the vibrator and a movable body and driven in a first direction by the vibrator; and a moving mechanism that allows the movable body to move in a second direction relative to the driven body, in which the second direction is a direction intersecting the first direction in a plane parallel to a plane where the vibrator and the driven body are in contact with each other.

Further features of the present invention will become apparent from the following description of exemplary embodiments with reference to the attached drawings.

Advantageous Effects of Invention

According to the present invention, the output loss of a vibration type driving apparatus, a two-dimensional driving apparatus, an image-blur correction apparatus, an interchangeable lens, an image pickup apparatus, or an automatic stage can be reduced without causing the vibrator to perform an intersecting operation. Thus, the problems of the output loss due to acceleration and deceleration of the vibrator, the possibility of breakage of the wires of the power supply member, and an increase in the size of the apparatus due to the space in which the vibrator and the power supply member can move can be solved.

BRIEF DESCRIPTION OF DRAWINGS

FIG. 14C is a diagram of another configuration of the moving mechanism.

DESCRIPTION OF EMBODIMENTS

Figure 1:
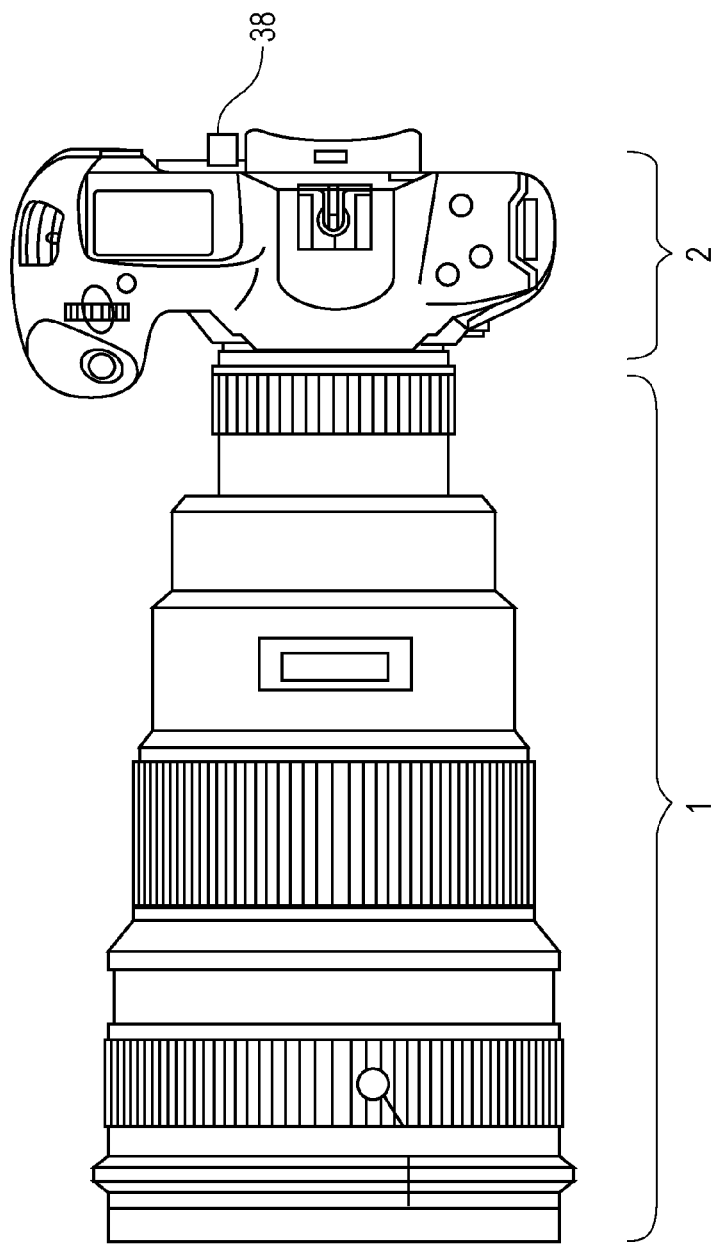
FIG. 1 is a diagram of an image pickup apparatus.

Embodiments of the present invention will be described hereinbelow.

In the present invention, "a plane where the vibrator and the driven body are in contact with each other" means a virtual plane including a plurality of contact points at which the vibrator and the driven body are in contact with each other. "A plane parallel to a plane where the vibrator and the driven body are in contact with each other" means a virtual plane that is substantially parallel to the virtual "plane where the vibrator and the driven body are in contact with each other". There are an infinite number of planes. They are planes for defining the moving direction of the moving mechanism of the present invention, which include not only a plane that is exactly parallel to the plane where the vibrator and the driven body are in contact with each other but also a substantially parallel plane, and which are defined to clearly determining the first direction and the second direction. In the present invention, the first direction is a direction in which the vibrator drives the driven body and is also referred to as a driving direction. The second direction of the present invention is a direction in which the movable body can be moved relative to the driven body by the moving mechanism of the present invention and is also referred to as "deflecting direction". "Deflect" means that, when a force in a direction intersecting the driving direction of the driven body acts on the movable body, the movable body moves without resisting the force. The moving mechanism of the present invention is characterized in that it can move the movable body in the second direction defined by the above configuration relative to the driven body.

In the present invention, the configuration that allows the movable body to be moved selectively in the second direction relative to the driven body (the driven body is not substantially moved in the first direction while the vibrator is halted) can be achieved by providing a guide member that can move only in the second direction. Furthermore, this configuration can also be achieved by supporting the driven body relative to the movable body with an elastic member (typically, a spring member) and making the elastic member easily displace only in a specific direction.

In the present invention, a state in which "a force in a second direction intersecting the first direction" is present means a state in which a force of a component in a direction different from the driving direction, or the first direction, is present (a moving force in a direction different from the first direction is generated). The state in which a moving force in a direction different from the driving direction acts causes an output loss, as described above. Although the output loss is highest when the angle at which the first direction and the second direction intersect is typically 90 degrees, an output loss corresponding to an intersecting angle can be generated, if only slightly intersecting.

The vibrator of the present invention is constituted by a vibration plate (also referred to as a vibrating body) and an electro-mechanical energy conversion device (representatively, a piezoelectric element, such as piezoelectric ceramics) and can excite a desired vibration by applying a specific electric field to the electro-mechanical energy conversion device.

In the present invention, a linear-motion-type vibration type driving apparatus means a vibration type driving apparatus capable of linear driving and is also referred to as a linear vibration type driving apparatus. The linear vibration type driving apparatus, if singly, linearly moves the movable body via the driven body; however, by combining a plurality of linear-motion-type vibration type driving apparatuses, the movable body can be multidimensionally moved in a desired direction.

Although the present invention will be specifically described hereinbelow with reference to embodiments, the present invention is not limited by the descriptions at all.

First Embodiment

FIG. 1 is a diagram of a camera serving as an image pickup apparatus according to a first embodiment of the present invention. The camera in FIG. 1 has a function of capturing a moving image and a still image. Reference sign 1 denotes a lens barrel equipped with an image-blur correction apparatus, and reference sign 2 denotes a camera body including an image pickup element 36 (a photoelectric conversion element or the like).

Figure 2:
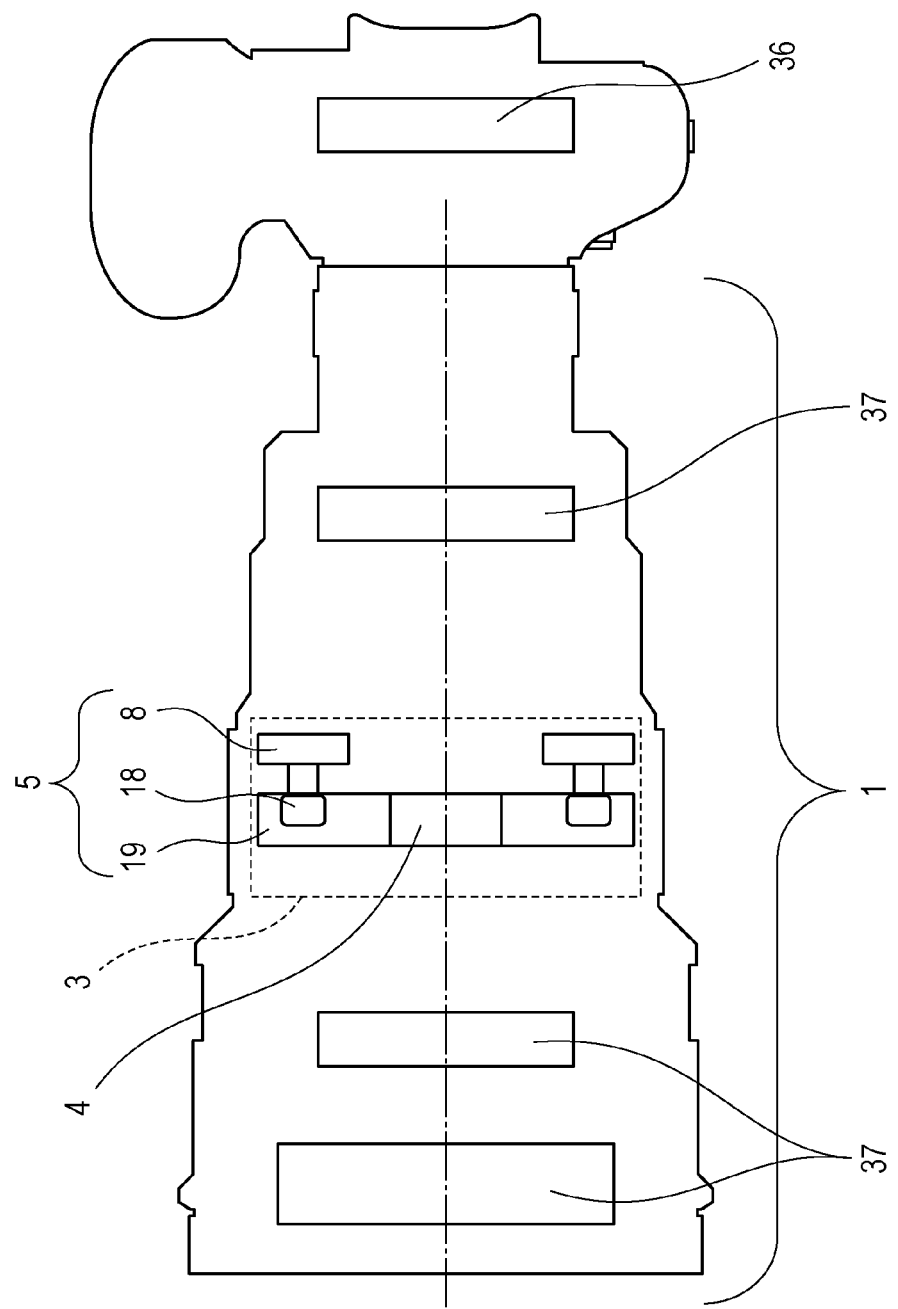
FIG. 2 is a schematic diagram of the interior of a lens barrel.

FIG. 2 is a schematic diagram of the interior of the lens barrel 1 and the camera body 2. Reference sign 3 denotes an image-blur correction apparatus. Reference sign 4 denotes an optical lens. Reference sign 5 denotes a vibration type driving apparatus; 19 denotes a movable body, to which an optical lens 4 is mounted here; and 18 denotes a driven body, which is driven by a vibrator 8. The driven body 18 has a configuration for transmitting a displacement and a force to the movable body 19. In this configuration, the optical lens 4 can be moved by the vibrator 8. The part of the lens barrel 1 shown in FIG. 2 can be interchanged as an interchangeable lens, and an inter-changeable lens suitable for an image acquisition target can be mounted to the camera body.

Furthermore, the lens barrel 1 includes an optical system 37 other than the optical lens 4. Although not shown in FIG. 2, the camera further includes an acceleration sensor that detects a shake of the lens barrel 1 and an encoder that detects two-dimensional movement of the movable body 19. The camera further includes a power source 38 that supplies electrical energy to the vibration type driving apparatus 5 and a control unit that incorporates a control method for processing a signal output from the acceleration sensor and a signal output from the encoder and controlling the power source 38.

Light from a subject passes through the optical system 37 including the optical lens 4 in the lens barrel 1 and enters the image pickup element 36 in the camera body 2. By moving the optical lens 4 with the image-blur correction apparatus 3 on the basis of the signal from the acceleration sensor, an image blur due to camera shake or the like can be corrected. Although an example in which the optical lens 4 is mounted to the movable body 19 is shown here, the present invention is not limited thereto; the present invention includes, for example, a case where the image pickup element 36 is mounted to the movable body 19, and an image blur is corrected by moving the image pickup element 36 with the image-blur correction apparatus 3. Furthermore, although an example in which the image-blur correction apparatus 3 is provided in the lens barrel 1 is shown here, the present invention is not limited thereto. The present invention includes, for example, a case where the lens barrel 1 is not separated from the camera body 2, and the lenses and the image-blur correction apparatus 3 are provided in the camera body 2.

Figure 3:
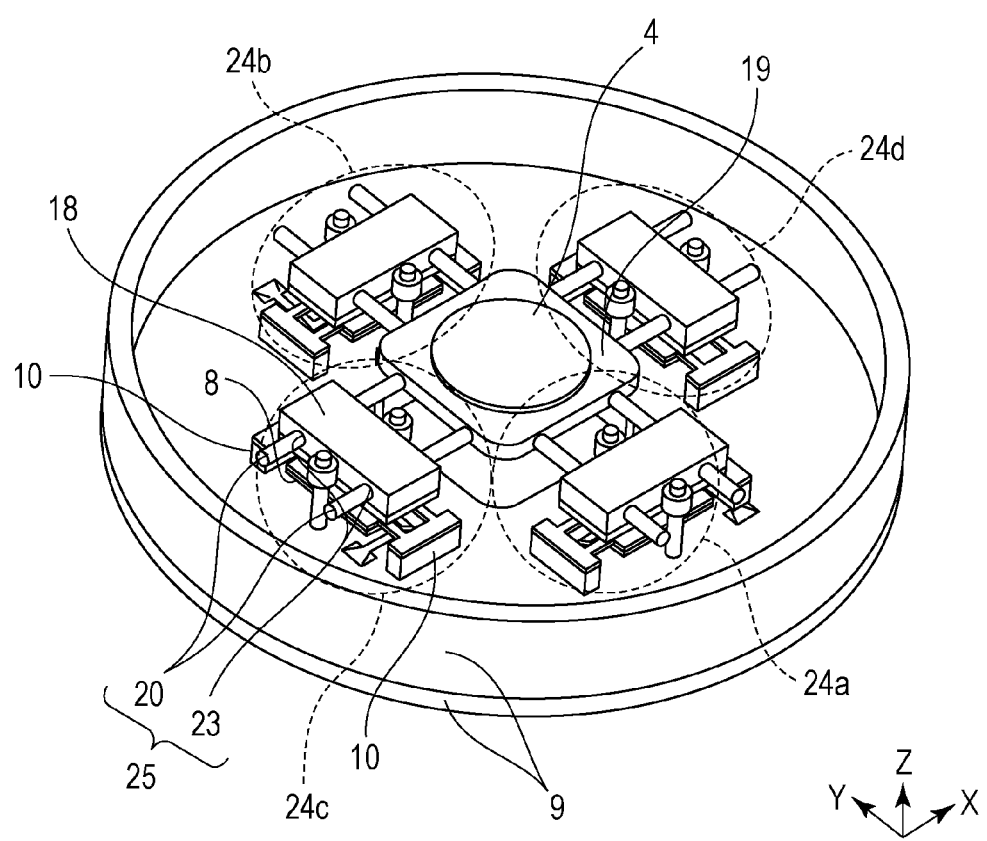
FIG. 3 is a perspective view of an image-blur correction apparatus.

FIG. 3 is a perspective view of the image-blur correction apparatus 3. Reference sign 9 denotes, for example, part of the lens barrel 1. The lens barrel 1 has four vibration type driving apparatuses 24 (24a, 24b, 24c, and 24d). The vibration type driving apparatuses 24a to 24d share a movable body 19. The movable body 19 holds the optical lens 4. The vibration type driving apparatuses 24 are actuators capable of linear driving. The driving direction of the vibration type driving apparatuses 24a and 24b is the X-direction in FIG. 3. On the other hand, the driving direction of the vibration type driving apparatuses 24c and 24d is the Y-direction in FIG. 3. By combining the drives of the four vibration type driving apparatuses 24, a two-dimensional driving apparatus capable of driving the movable body 19 in two dimensions (in the X-direction, in the Y-direction, and about the Z-axis) is provided. In addition to that, the optical lens 4, the acceleration sensor, the encoder, and the control unit for correcting an image blur are provided to configure an image-blur correction apparatus.

The lens barrel 9 has four vibrator mount portions 10 to which the vibrators 8 are mounted. The vibrators 8 are each in pressure-contact with a driven body 18. The driven body 18 has driven-body transmitting portions 23. The movable body 19 holds the optical lens 4. The movable body 19 connects to eight guide members 20. By the vibrator 8 driving the driven body 18 and transmitting the driving force to the movable body 19 via the driven-body transmitting portions 23 and the guide members 20, the optical lens 4 on the movable body 19 is moved. In the first embodiment, the driven-body transmitting portions 23 and the guide members 20 constitute a moving mechanism 25.

The vibration type driving apparatuses 24 according to an embodiment of the present invention are each constituted by the vibrator 8, the driven body 18, the moving mechanism 25, and the movable body 19. The moving mechanism 25 of the vibration type driving apparatus 24, which is a feature of the present invention, is constituted by the driven-body transmitting portions 23 and the guide members 20. They will be described later.

Figure 4A:
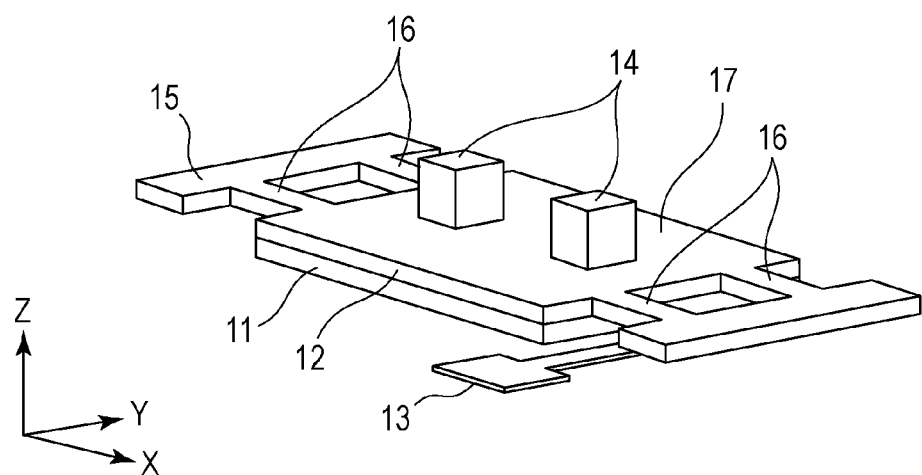
FIG. 4A is a perspective view of a vibrator.
Figure 4B:
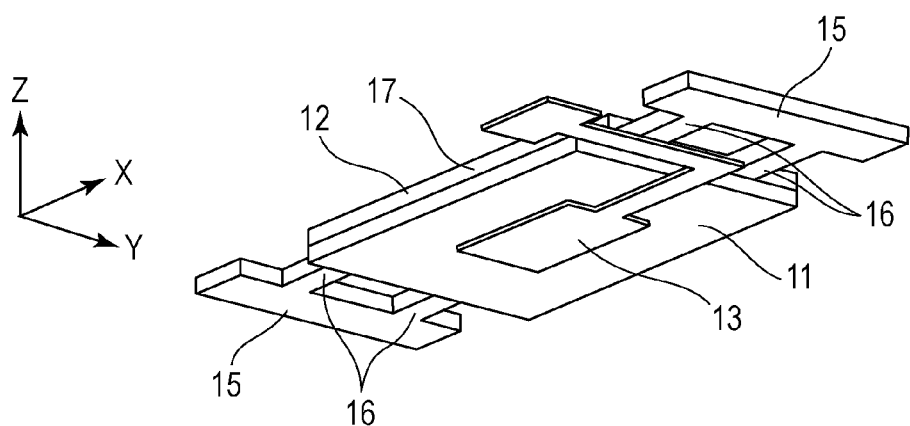
FIG. 4B is a perspective view of the vibrator.

Here, the configuration of the vibrator 8 will be described. FIGS. 4A and 4B are perspective views of the vibrator 8. The vibrator 8 is constituted by piezoelectric ceramics 11, which is a rectangular-plate-like electro-mechanical energy conversion device, and a metal vibration plate 12 having magnetism, and a flexible printed board 13, which is a conducting member for supplying electrical energy to the piezoelectric ceramics 11. The vibration plate 12 has two projecting portions 14, two vibrator fixing portions 15, four vibrator support beams 16, and a vibrator base portion 17, which are formed as a single unit. The vibrator base portion 17 of the vibration plate 12 is fixed to the piezo-electric ceramics 11 with an adhesive. The flexible printed board 13 is fixed to the piezoelectric ceramics 11 with an adhesive. The piezoelectric ceramics 11 includes internal electrodes layered in the thickness direction and an external electrode for electrically connecting the internal electrodes and wires of the flexible printed board 13. The flexible printed board 13 is electrically connected to the power source 38.

Figure 5A:
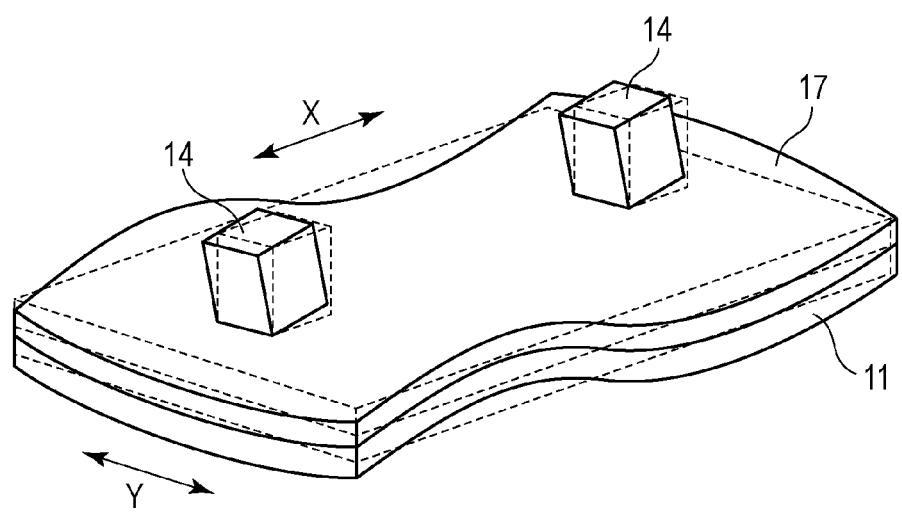
FIG. 5A is a diagram of a vibration mode.
Figure 5B:
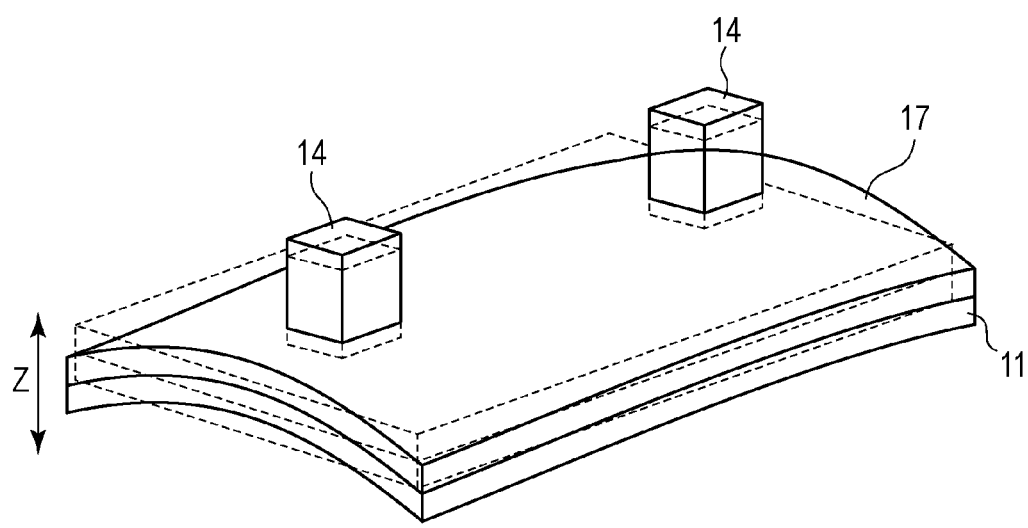
FIG. 5B is a diagram of a vibration mode.

Here, the operation of the vibrator 8 will be described. An alternating voltage is applied to the piezoelectric ceramics 11 to excite vibrations in two vibration modes in the vibrator 8. FIGS. 5A and 5B show the two vibration modes. The vibration mode in FIG. 5A is also referred to as A-mode. The vibration mode in FIG. 5B is also referred to as B-mode. The vibration mode shown in FIG. 5A is a vibration mode (A-mode) in which the upper surfaces of the projecting portions 14 vibrate in the longitudinal direction of the vibrator 8 (also referred to as a feeding direction: the X-direction in FIG. 5A). The vibration mode shown in FIG. 5B is a vibration mode (B-mode) in which the upper surfaces of the projecting portions 14 vibrate in a direction in which the projecting portions 14 come into contact with the driven body 18 (also referred to as a pushing-up direction: the Z-direction in FIG. 5A). The alternating voltage is set so as to excite vibrations in the two vibration modes at about 90 degrees in time phase. Here, "about 90 degrees" means that angles other than exact 90 degrees are allowed in a range in which necessary vibrations are generated. The same applies to the expression "about" in the present invention. Thus, the upper surfaces of the projecting portions 14 move in an elliptic orbit in a plane parallel to the X-Y plane in the drawings. Setting the phase difference between the vibrations in the two vibration modes to about −90 degrees can reverse the direction of advance of the elliptic orbit.

Although the case where vibrations in the two vibration modes are excited in the vibrator 8 to move the upper surfaces of the projecting portions 14 in an elliptic orbit has been described, the vibration mode and the form of the vibrator 8 are not limited thereto. For example, a vibrator including a single projecting portion and having a vibration mode in the Z-direction in the drawing can be used. In this case, by tilting the projecting portion relative to the vertical line into contact with the contact surface of the driven body 18 with the vibrator, the driven body 18 can be driven.

Figure 6:
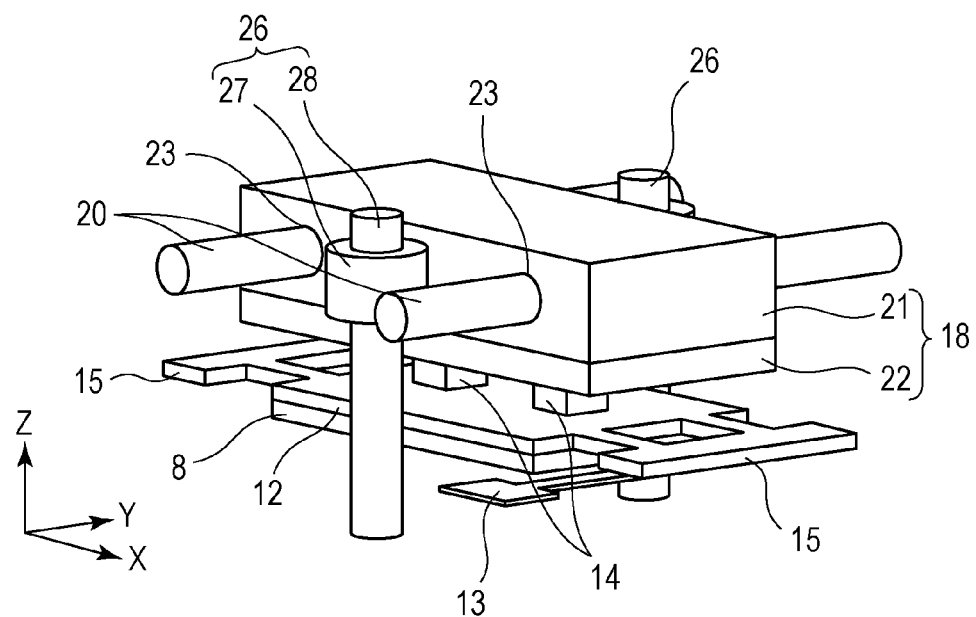
FIG. 6 is a perspective view of a vibration type driving apparatus.

Here, the configuration and the driving operation of the vibration type driving apparatus 24 will be described. FIG. 6 is a perspective view of the vibration type driving apparatus 24. The driven body 18 is constituted by a driven-body main body 21 and an abrasion-resistant member 22 formed of a highly abrasion-resistant material. The driven-body main body 21 and the abrasion-resistant member 22 are fixed with screws (not shown). The driven body 18 and the vibrator 8 are disposed so that the abrasion-resistant member 22 is in contact with the upper surfaces of the projecting portions 14 of the vibrator 8. The driven-body main body 21 is made of a neodymium magnet, which generates an attracting force between it and the vibration plate 12 having magnetism. This causes the projecting portions 14 and the abrasion-resistant member 22 to come into pressure-contact with each other. As described above, when vibrations in the two vibration modes are excited in the vibrator 8, a motion in an elliptic orbit can be generated at the upper surfaces of the projecting portions 14. This allows the driven body 18 that is in pressure-contact with the upper surfaces of the projecting portions 14 to be driven in the X-direction in FIG. 6. Here, although the example in which the vibration plate 12 is formed of a material having magnetism, and the attracting force between the vibration plate 12 and the driven-body main body 21 made of a neodymium magnet causes the projecting portions 14 and the abrasion-resistant member 22 to come into pressure-contact with each other is shown, the vibration type driving apparatus of the present invention is not limited thereto. For example, the vibration plate 12 and the driven-body main body 21 may be formed of nonmagnetic materials. In this case, providing a pressure member, such as a coil spring, allows the projecting portions 14 and the abrasion-resistant member 22 to be brought into pressure-contact with each other.

Here, the configuration of the moving mechanism 25, which is a feature of the present invention, will be described. The driving direction (a first direction) in which the vibrator 8 drives the driven body 18 is the X-direction (the first direction) in FIG. 6. The Y-direction (a second direction, or a deflecting direction) intersects the X-direction (the first direction).

The driven-body main body 21 of the driven body 18 has round-hole-shaped openings whose axis extends in the Y-direction (the second direction) as the driven-body transmitting portions 23. The inner circumferential surfaces of the openings are subjected to hard plating to improve abrasion resistance. The guide members 20 made of an abrasion-resistant material are disposed so as to pass through the openings (driven-body transmitting portions 23). The guide members 20 are connected to the movable body 19 and have a round-bar shape whose longitudinal direction (axial direction) extends in the Y-direction (the second direction). The inner circumferential surfaces of the round holes of the driven-body transmitting portions 23 and the outer circumferential surfaces of the round-bar-shaped guide members 20 are surfaces that move relative to each other in the Y-direction (the second direction, or the deflecting direction) in FIG. 6. These surfaces are coated with lubricant so as to reduce a load during sliding. The above configuration of the guide members 20 and the driven-body transmitting portions 23, serving as the moving mechanism 25, allows the driven body 18 and the movable body 19 to move relative to each other in the Y-direction (the second direction, or the deflecting direction) under a small load. Furthermore, the moving mechanism 25 can transmit a displacement and a force in the driving direction (the first direction) to the movable body 19.

Figure 7:
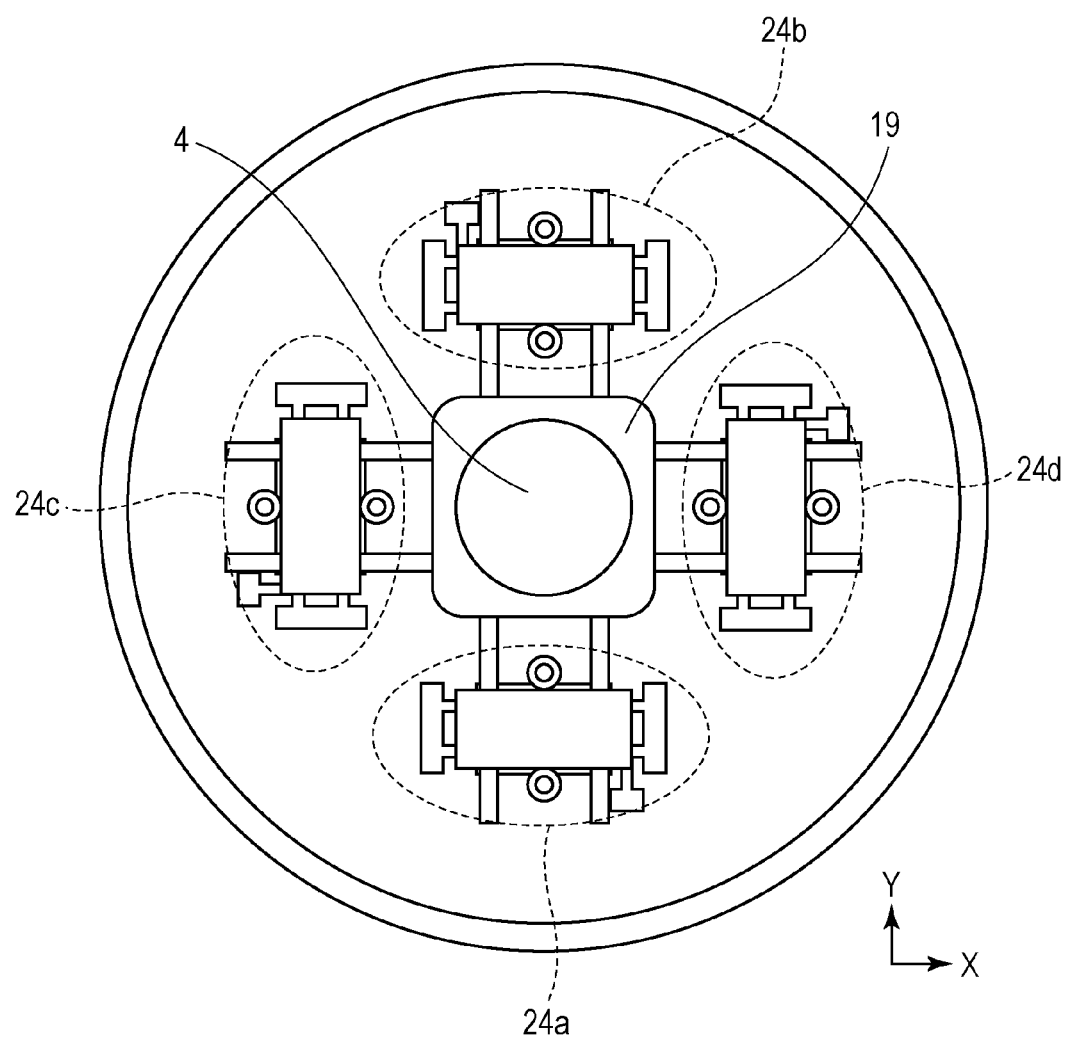
FIG. 7 is a front view of the image-blur correction apparatus.

Here, the operation of the vibration type driving apparatus 24 in the two-dimensional driving apparatus will be described. FIG. 7 is a front view of the image-blur correction apparatus 3. The origin of the coordinate system in FIG. 7 is located at the center of the outer circumference of the lens barrel 1. The driving direction (the first direction) of the vibration type driving apparatuses 24a and 24b are in the X-direction in FIG. 7, and the deflecting direction (the second direction) by means of the moving mechanisms 25 is in the Y-direction. The driving direction (the first direction) of the vibration type driving apparatuses 24c and 24d are in the Y-direction, and the deflecting direction (the second direction) by means of the moving mechanisms 25 is in the X-direction.

Figure 8:
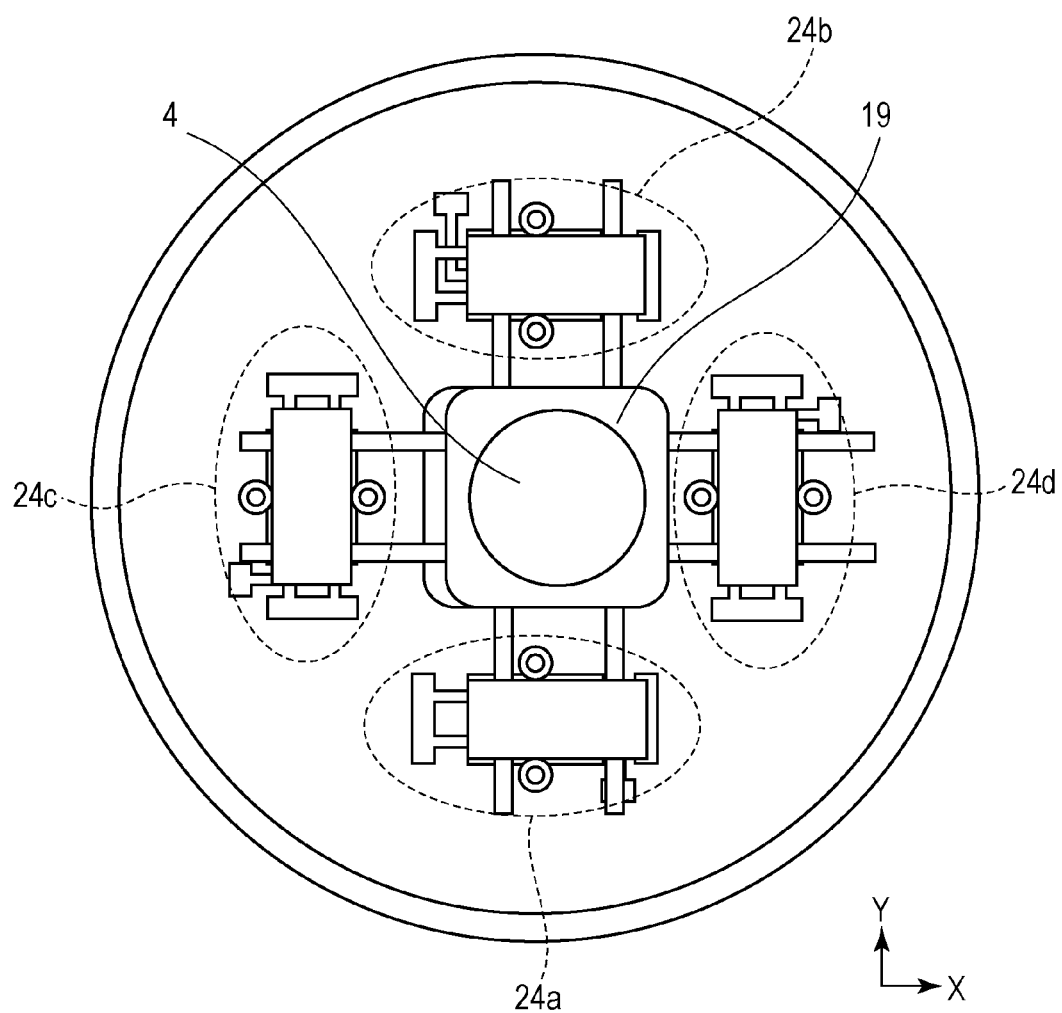
FIG. 8 is a front view of the image-blur correction apparatus, showing the operation thereof.

Driving the vibration type driving apparatuses 24a and 24b allows the movable body 19, which holds the optical lens 4, to be moved in the positive X-direction, as shown in FIG. 8.

Since the driving direction (the first direction) of the vibration type driving apparatuses 24c and 24d is in the Y-direction, the vibration type driving apparatuses 24c and 24d do not contribute to movement of the movable body 19. At this time, the movable body 19 can be moved relative to the vibration type driving apparatuses 24a and 24b in the X-direction (the second direction) by the moving mechanisms 25, and thus, a load that hinders movement of the movable body 19 in the X-direction is not generated. Furthermore, also the vibrator 8 and the driven body 18 are not moved.

Figure 9:
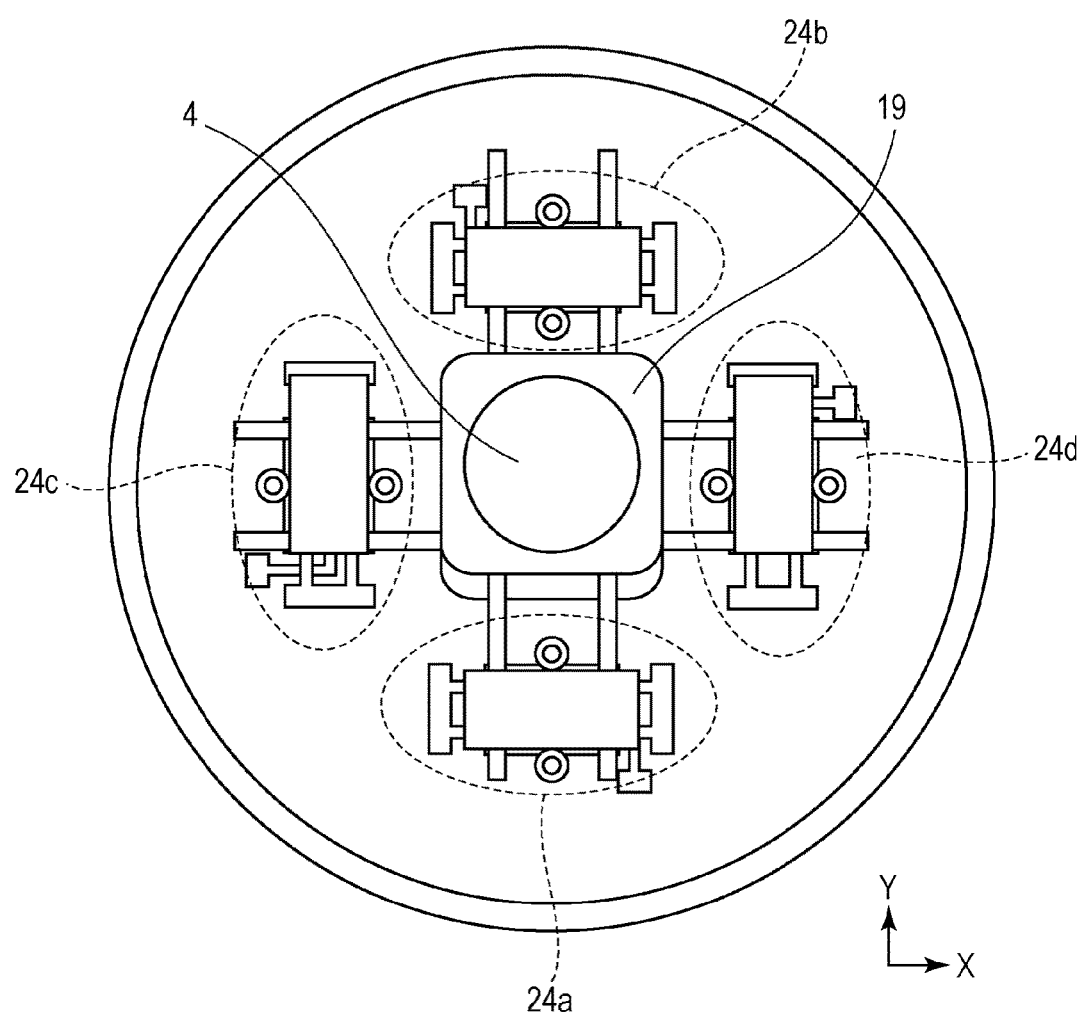
FIG. 9 is a front view of the image-blur correction apparatus, showing the operation thereof.

Driving the vibration type driving apparatuses 24c and 24d allows the movable body 19 to be moved in the positive Y direction, as shown in FIG. 9. Accordingly, the vibration type driving apparatuses 24a and 24b do not generate a load that hinders movement of the movable body 19 in the Y-direction by means of the moving mechanisms 25 on the basis of the above principle. Furthermore, also the vibrator 8 and the driven body 18 are not moved.

Figure 10:
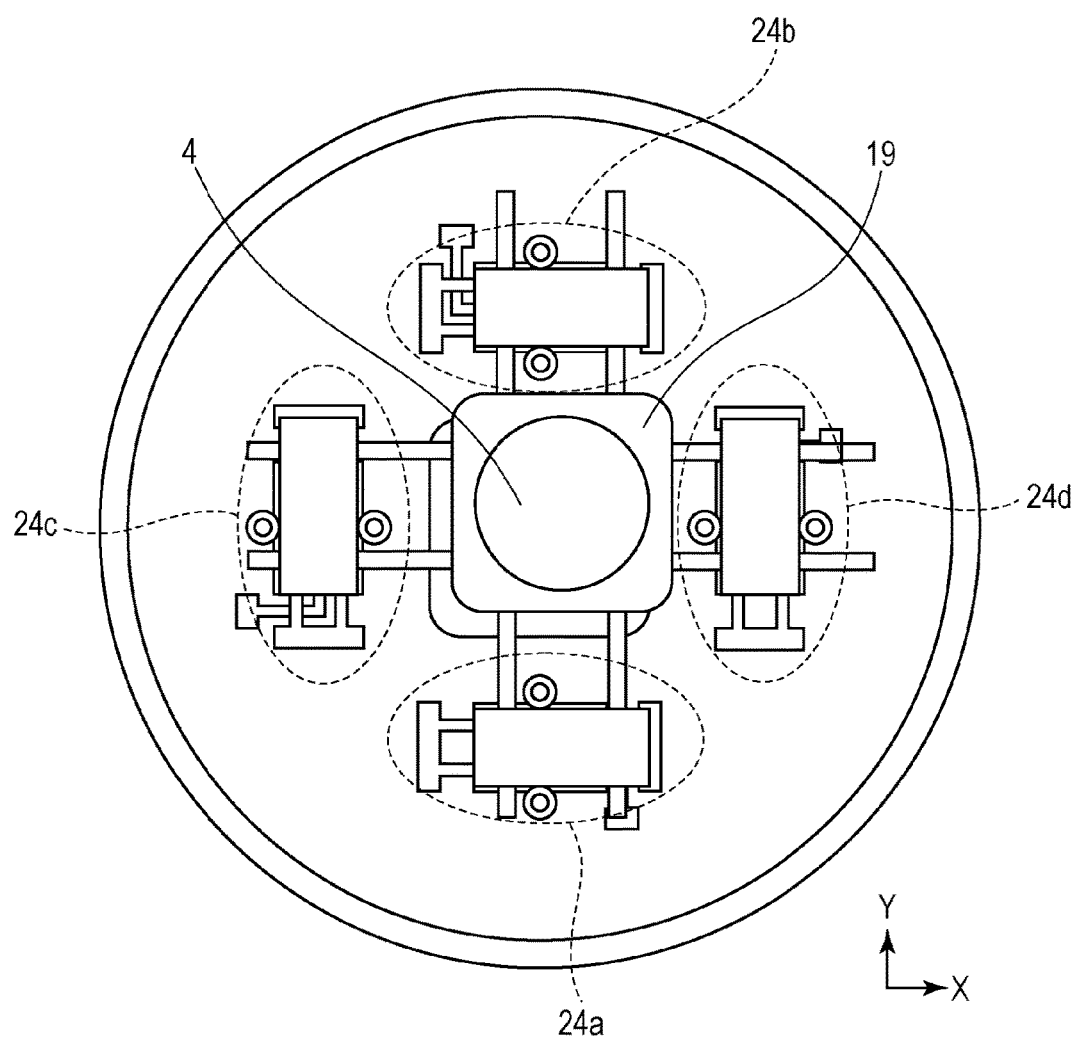
FIG. 10 is a front view of the image-blur correction apparatus, showing the operation thereof.

FIG. 10 is a diagram showing a state in which all the vibration type driving apparatuses 24 (24a, 24b, 24c, and 24d) are operated to move the movable body 19 between the X- and Y-directions. In this case, the moving mechanisms 25 of all the vibration type driving apparatuses (24a, 24b, 24c, and 24d) move relative to each other, and movement of the movable body 19 in both the X-direction and the Y-direction is not hindered by the vibration type driving apparatuses 24.

Furthermore, a configuration in which the driven-body transmitting portions 23 have flexibility in rotation about the Z-axis allows the movable body 19 to move about the Z-axis perpendicular to the X-axis and the Y-axis. This can be achieved by, for example, driving the vibration type driving apparatus 24a in the positive X-direction, driving the vibration type driving apparatus 24b in the negative X-direction, driving the vibration type driving apparatus 24c in the negative Y-direction, and driving the vibration type driving apparatus 24d in the positive Y-direction.

By adjusting the amount of driving of the vibration type driving apparatuses 24 (24a, 24b, 24c, and 24d), the movable body 19 can be moved to any positions in the X-Y plane. Rotational movement in the plane of the drawing can be added thereto.

The advantages of the present invention will be described by comparing the related art and the present invention. In the related art, the vibrator needs to be moved when the movable body moves in a direction intersecting the driving direction of the vibrator. Thus, the vibration type driving apparatus requires additional accelerating force and decelerating force due to the mass of the vibrator during acceleration and deceleration. Furthermore, since the power supply member for supplying power to the vibrator is moved together with the vibrator, for example, the flexible printed board serving as the power supply member is significantly deformed, thus causing a possibility that, wires can be broken. Furthermore, a space in which the vibrator and the power supply member can move must be provided, thus increasing the size of the apparatus.

On the other hand, in an embodiment of the present invention, the vibrator 8 and the driven body 18 stand still in the deflecting direction (the second direction) in contrast to the relate art. Thus, the present invention has the following advantages as compared with the related art.

Specifically, the moving mechanism that can move the movable body in the direction (the second direction) intersecting the driving direction (the first direction) of the vibrator is provided between the driven body and the movable body. This allows the output loss of the vibration type driving apparatus, the two-dimensional driving apparatus, the image-blur correction apparatus, the interchangeable lens, the image pickup apparatus, or the automatic stage to be reduced without the vibrator and the driven body performing a deflecting operation. This can therefore reduce the output loss for accelerating or decelerating the vibrator, thereby preventing the wires of the power supply member from breaking or an increase in the size of the apparatus due to the space in which the vibrator and the power supply member can move.

Here, a limiting mechanism will be described using FIG. 6. Reference sign 26 denotes a limiting mechanism. Two limiting mechanism 26 are provided for each vibration type driving apparatus 24. The limiting mechanisms 26 are each constituted by a shaft 28 fixed to the lens barrel 1 and a roller 27 rotatable about the shaft 28. The rollers 27 are disposed such that the outer circumferential surfaces thereof are in contact with sides of the driven body 18 from both sides of the driven body 18 in the Y-direction (the second direction). In other words, the two limiting mechanisms 26 are disposed so as to flank the driven body 18 in the second direction. This limits the amount of relative movement of the vibrator 8 and the driven body 18 in the Y-direction (the second direction). On the other hand, the relative movement of the vibrator 8 and the driven body 18 in the X-direction (the first direction) is not restricted.

Here, an advantage of the limiting mechanisms 26 will be described. When the driving direction (the first direction) of the vibrator 8 shifts from the X-direction due to an error of the mounting position or the like, the driven body 18 receives also a force in the Y-direction (the second direction) by driving of the vibrator 8. This causes the driven body 18 to be moved in the Y-direction (the second direction), which hinders the vibrator 8 and the driven body 18 from coming into contact in a predetermined range, thus causing unstable contact. Too large deviation will hinder the contact between the vibrator 8 and the driven body 18. However, since the first embodiment is provided with the limiting mechanisms 26 described above, the vibrator 8 and the driven body 18 can be constantly in contact with each other in a predetermined range. Not the deviation in the driving direction but deviation of the vibrator 8 and the driven body 18 in the Y-direction (the second direction) can occur due to an external impact or the like. Also in this case, the vibrator 8 and the driven body 18 can be kept contact in a predetermined range by the limiting mechanisms 26.

Here, a supplement to the first embodiment will be described. In the first embodiment, although the four vibration type driving apparatuses 24 are disposed such that the driving directions (first directions) intersect, the present invention is not limited thereto; the two-dimensional movement of the movable body 19 is possible as in the first embodiment provided that the vibration type driving apparatuses 24 are disposed such that the driving directions thereof intersect. The advantages of the moving mechanisms 25 and the limiting mechanisms 26 of this case are the same.

Furthermore, although this embodiment achieves the two-dimensional movement of the movable body 19 using only the vibration type driving apparatuses 24, part thereof may be replaced with a driving unit, such as a voice coil motor that uses no contact. The two-dimensional movement of the movable body 19 can be achieved, even if, for example, the voice coil motor and the vibration type driving apparatuses 24 are disposed such that the driving directions thereof differ.

Second Embodiment

Figure 11:
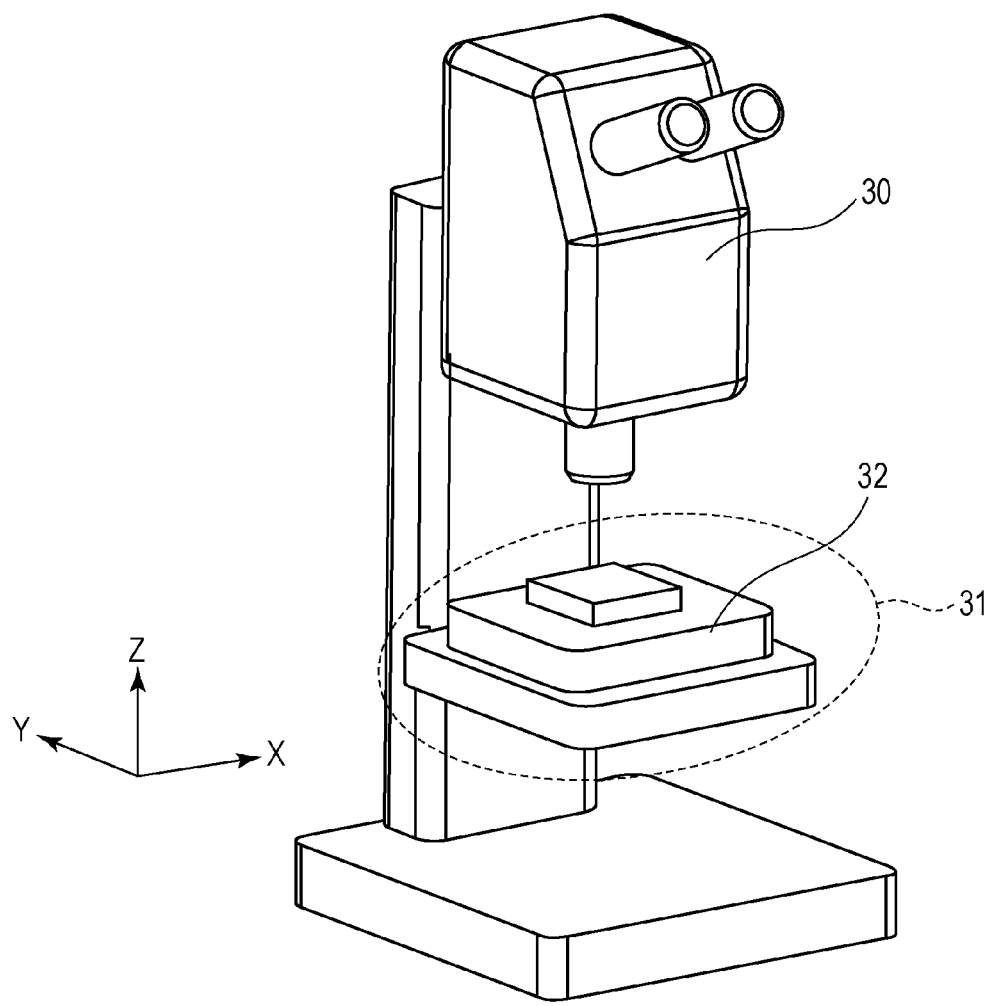
FIG. 11 is a perspective view of a microscope serving as an image pickup apparatus.

FIG. 11 is a perspective view of a microscope serving as an image pickup apparatus according to a second embodiment of the present invention. The microscope in FIG. 11 includes an image pickup portion 30 that accommodates an image pickup element and an optical system and an automatic stage 31 having a two-dimensional driving apparatus 32. An observation target is placed on the two-dimensional driving apparatus 32, and an enlarged image is acquired by the image pickup portion 30. In the case where the observation range is wide, the observation target is moved in the X-direction and the Y-direction in FIG. 11 by the two-dimensional driving apparatus 32 to acquire a large number of images. The acquired images can be combined by a computer (not shown) to acquire a high-definition image in a wide observation range.

Figure 12:
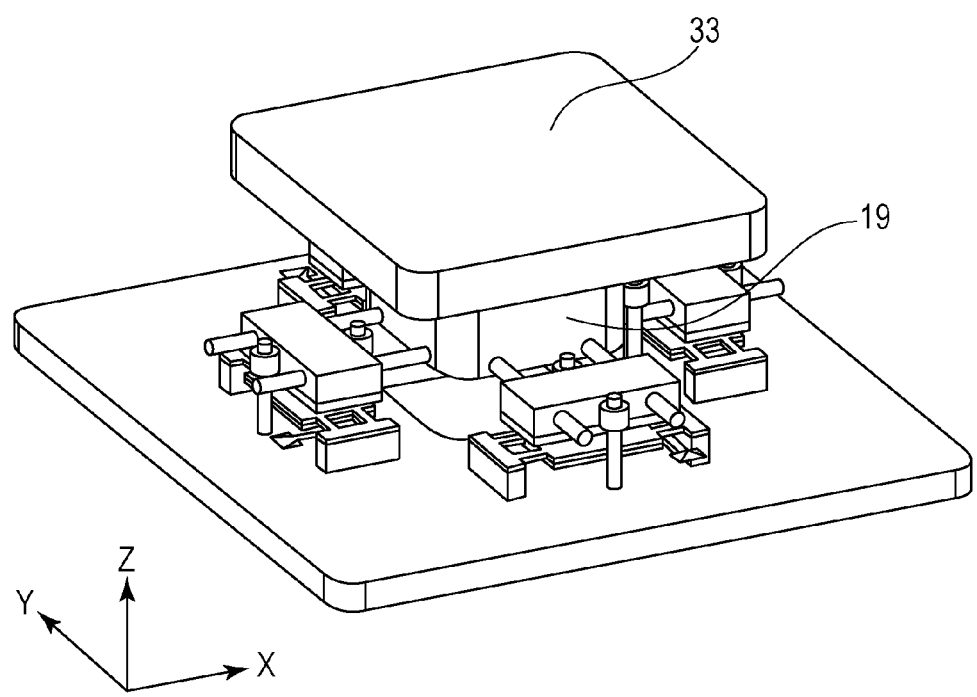
FIG. 12 is a perspective view of a two-dimensional driving apparatus.

Here, the two-dimensional driving apparatus 32 will be described. FIG. 12 is a perspective view of the two-dimensional driving apparatus 32. A functional difference between the two-dimensional driving apparatus 32 of the second embodiment and the two-dimensional driving apparatus of the first embodiment is that the component mounted to the movable body 19 changes from the optical lens 4 to an observation-target mount portion 33. An observation target is placed on the observation-target mount portion 33, and an image is acquired while the observation target is being moved in two dimensions. The two-dimensional driving apparatus 32 can be rotated about the Z-axis, as in the first embodiment. This operation can be used to adjust the position of the observation target.

Although this embodiment has been described as applied to an example in which a two-dimensional driving unit equipped with the vibration type driving apparatus of the present invention is applied to an automatic stage of a microscope, the present invention is not limited thereto; it can be applied to stages of various apparatuses.

Third Embodiment

Figure 13A:
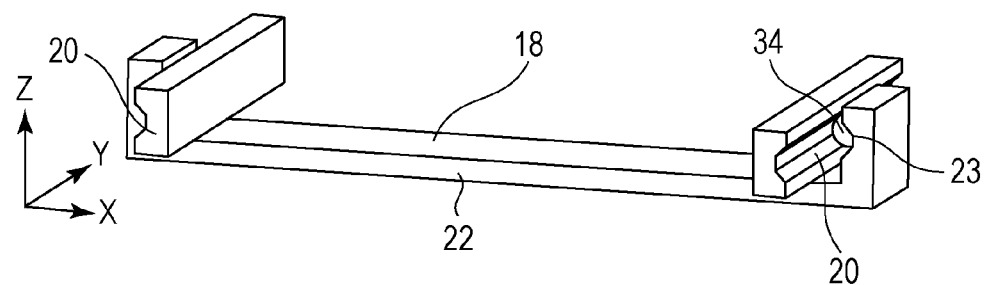
FIG. 13A is a perspective view of a moving mechanism and a driven body.
Figure 13B:
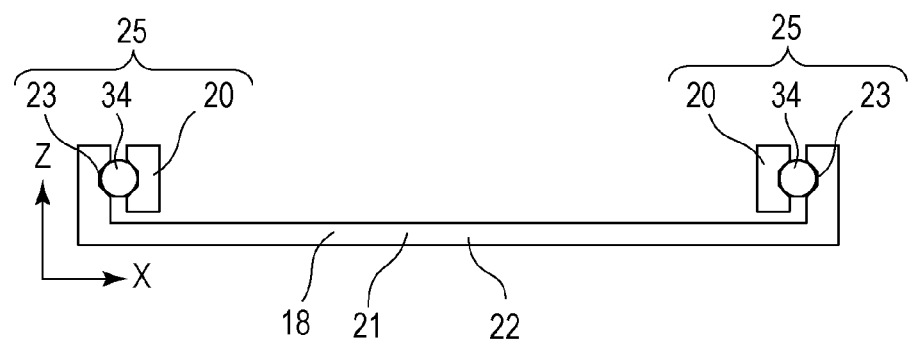
FIG. 13B is a front view of the moving mechanism and the driven body.

The difference between a third embodiment and the first embodiment is the configuration of the moving mechanisms 25. This will be described. FIG. 13A is a perspective view of the moving mechanism 25 and the driven body 18. FIG. 13B is a front view thereof. The X-direction in the drawings is the driving direction (the first direction) of the vibration type driving apparatus 24. The Y-direction is a deflecting direction (the second direction) in which the movable body 19 and the driven body 18 can move relative to each other by means of the moving mechanism 25.

The guide members 20 are connected to the movable body 19, have a trapezoidal shape in cross section in the X-and Y-directions, and each have a groove extending in the Y-direction (the deflecting direction, or the second direction). The driven-body transmitting portions 23 of the driven body 18 have a trapezoidal shape in cross section in the X- and Y-directions and each have a groove extending in the Y-direction (the deflecting direction, or the second direction). A ceramic rollable spherical ball 34 having a curved surface is disposed between the grooves. The guide members 20, the driven-body transmitting portions 23, and the balls 34 constitute the moving mechanism 25. The moving mechanisms 25 are disposed at both ends of the driven body 18 in the X-direction (the driving direction, or the first direction). The movable body 19 and the driven body 18 are subjected to pre-load in the Z-direction in the drawings by a pressurizing unit (not shown). This causes the slopes of the grooves of the driven-body transmitting portions 23 and the balls 34 to come into pressure-contact with each other. Similarly, the slopes of the grooves of the guide members 20 and the balls 34 are in pressure-contact with each other. Accordingly, the movable body 19 and the driven body 18 can be moved relative to each other in the Y-direction (the deflecting direction, or the second direction) by the moving mechanism 25. During the relative movement, the balls 34 roll on the surfaces of the guide members 20 and the driven-body transmitting portions 23. Since the rolling resistance is extremely small, the load of the moving mechanism 25 during sliding is extremely small. Furthermore, since the balls 34 are constantly in a pressure-contact state, the moving mechanism 25 has no clearance. On the other hand, for the X-direction (the driving direction, or the first direction), the guide members 20 and the driven-body transmitting portions 23 cannot move relative to each other and can transmit a displacement and a force in this direction to the movable body 19. The moving mechanism 25 has no clearance also in this direction.

A method for manufacturing the driven body 18 will be described. The grooves of the driven-body transmitting portions 23 are formed in a thin-plate stainless material by forging, which is a kind of press working, and thereafter, both ends thereof in the X-direction are bent by press working. Thereafter, the surface is subjected to nitriding to form an abrasion-resistant member. Since the press working is a low-price manufacturing method, the driven body 18 can be manufactured at low price. Similarly, the guide members 20 to be connected to the movable body 19 can also be manufactured at low price because it is processed by forging, which is a kind of press working.

Figure 13C:
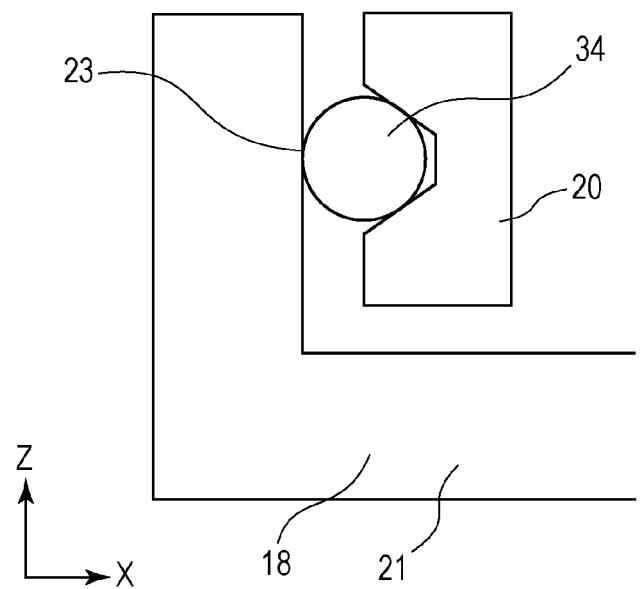
FIG. 13C is a partially enlarged front view of the moving mechanism.

FIG. 13C is a partially enlarged front view of the moving mechanism 25 of an example in which the shape of the driven-body transmitting portion 23 is changed from the groove to a flat surface. As in the third embodiment described above, the moving mechanism 25 is configured to be capable of moving the movable body 19 and the driven body 18 relative to each other in the Y-direction (in a direction out of the paper surface, the deflecting direction, or the second direction). At the movement, the balls 34 roll on the surfaces of the guide members 20 and the driven-body transmitting portions 23. Since the rolling resistance is extremely small, the load of the moving mechanism 25 during sliding is extremely small. On the other hand, for the X-direction (the driving direction, or the first direction), the guide members 20 and the driven-body transmitting portions 23 cannot move relative to each other, and a displacement and a force in this direction can be transmitted to the movable body 19. In addition, they can also move relative to each other in the Z-direction. At this time, the balls 34 do not roll, and a sliding friction occurs between the contact surfaces of the driven-body transmitting portions 23 and the balls 34.

Figure 14A:
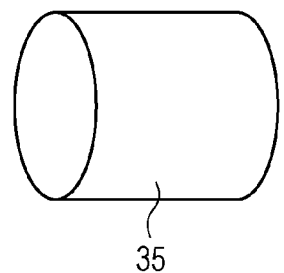
FIG. 14A is a diagram of another configuration of the moving mechanism.
Figure 14B:
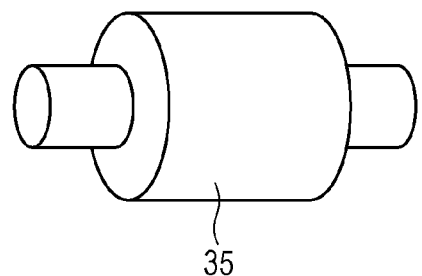
FIG. 14B is a diagram of another configuration of the moving mechanism.
Figure 14B:
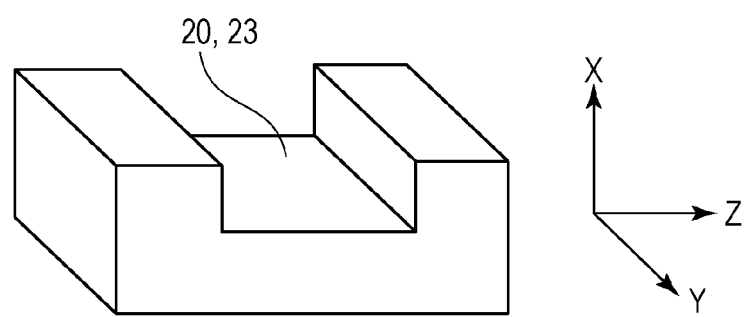

Another configuration of the moving mechanism 25 is shown in FIGS. 14A to 14C. FIGS. 14A and 14B show a cylindrical roll as a substitute for the ball 34 described above. Both the cylindrical shape as shown in FIG. 14A and the three-step cylindrical shape as shown in FIG. 14B have a rolling surface 35 (curved shape) having a rollable curve. FIG. 14C shows a rectangular-cross-sectional-shape groove as a substitute for the guide member 20 and the groove of the driven-body transmitting portion 23. The X-direction in FIG. 14C is the driving direction (the first direction) of the vibration type driving apparatus 24, and the Y-direction is the deflecting direction (the second direction). The cylinder is provided between the groove of the driven-body transmitting portion 23 and the groove of the guide member 20. Since the rolling surface 35 of the cylindrical roll rolls between the grooves, a moving mechanism capable of moving in the Y-direction (the deflecting direction, or the second direction) is configured.

Fourth Embodiment

Figure 15:
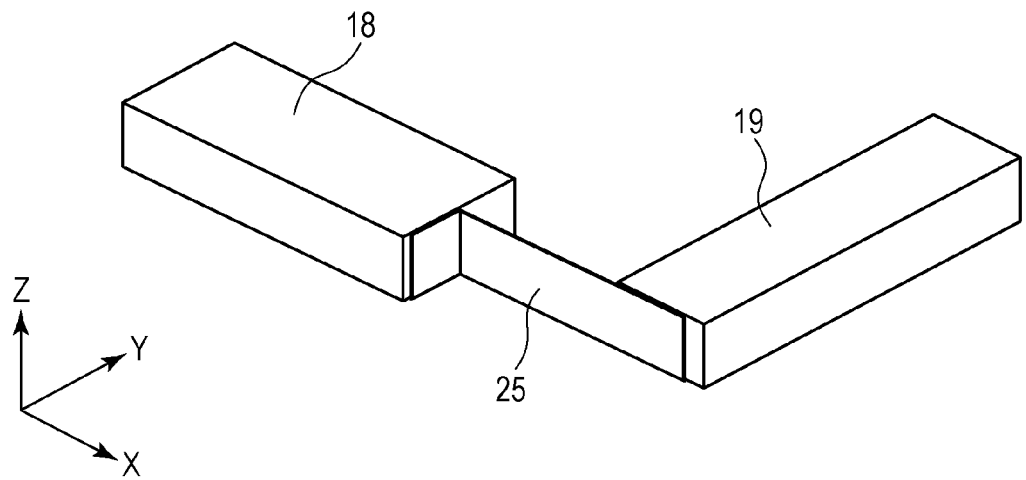
FIG. 15 is a perspective view of the moving mechanism, part of the movable body, and the driven body.

The difference between a fourth embodiment and the first embodiment is the configuration of the moving mechanism 25. This will be described. FIG. 15 is a perspective view of the moving mechanism 25, part of the movable body 19, and the driven body 18. The X-direction in FIG. 15 is the driving direction (the first direction) of the vibration type driving apparatus 24. The Y-direction is the deflecting direction (the second direction) in which the movable body 19 and the driven body 18 can be moved relative to each other by the moving mechanism 25.

The moving mechanism 25 is a stainless-steel elastic member having a thin rectangular plate shape. The plate thickness direction is the Y-direction (the deflecting direction, or the second direction). One end is bent at a right angle by press working and is fixed to the driven body 18. The other end is fixed to the movable body 19.

Since the thin plate-thickness direction of the moving mechanism 25 is the Y-direction (the deflecting direction, or the second direction), the bending rigidity in the Y-direction (the deflecting direction, or the second direction) is small. When the movable body 19 is moved in the Y-direction by another vibration type driving apparatus 24, the moving mechanism 25 is deformed in the Y-direction (the deflecting direction, or the second direction). This allows the driven body 18 and the movable body 19 to move relative to each other in the Y-direction (the deflecting direction, or the second direction). Since this moving mechanism 25 is a single component and can be formed by press working, it has advantages that it has a simple configuration and can be manufactured at low cost.

Furthermore, the size of the moving mechanism 25 in the X-direction (the driving direction, or the first direction) is larger than the size in the plate-thickness direction (the Y-direction, the deflecting direction, or the second direction). Thus, the rigidity in the X-direction (the driving direction, or the first direction) is higher than the rigidity in the Y-direction (the deflecting direction, or the second direction). Since the rigidity in the X-direction (the driving direction, or the first direction) is high, a displacement or a force can be transmitted in this direction. Furthermore, the moving mechanism 25 has no clearance in this direction, and thus, it has high accuracy of moving the movable body 19.

Fifth Embodiment

Figure 16:
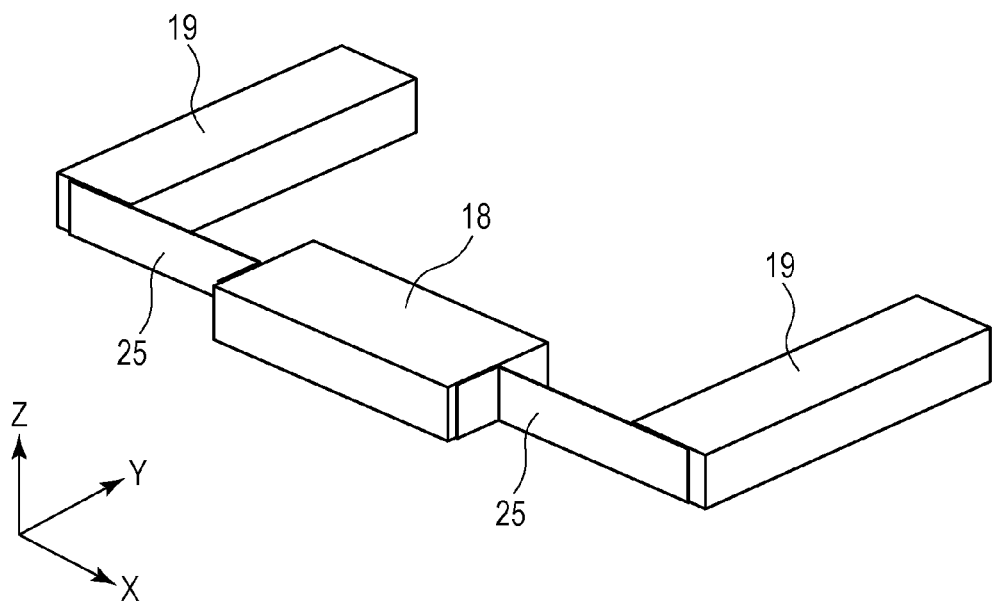
FIG. 16 is a perspective view of the moving mechanisms, part of the movable bodies, and the driven body.

The difference between a fifth embodiment and the fourth embodiment is the configuration of the moving mechanism 25. FIG. 16 is a perspective view of the moving mechanisms 25, part of the movable bodies 19, and the driven body 18. The X-direction in FIG. 16 is the driving direction (the first direction) of the vibration type driving apparatus 24. The Y-direction is the deflecting direction (the second direction) in which the movable bodies 19 and the driven body 18 can be moved relative to each other by the moving mechanisms 25.

Although, in the fourth embodiment, a single elastic member functions as the moving mechanism 25, the fifth embodiment is configured such that two (a plurality of) elastic members are arranged side by side in the X-direction (the driving direction, or the first direction). This increases the rigidity of the moving mechanisms 25 about the Z-axis in FIG. 16. When the movable bodies 19 move in the Y-direction (the deflecting direction, or the second direction), forces are exerted on the portions of the moving mechanisms 25 connected to the driven bodies 18. In the fifth embodiment, the two moving mechanisms 25 are connected in the X-direction so as to hold the driven body 18 therebetween. Accordingly, when the movable bodies 19 move in the Y-direction, the forces exerted on the connected portions are equal between the two moving mechanisms 25. Accordingly, no moment is generated in the driven body 18 in the direction about the Z-axis. This stabilizes the relative positions of the vibrator 8 and the driven body 18 about the Z-axis, thus providing an advantage for stabilizing the performance. This advantage is added to the advantages described in the fourth embodiment.

Sixth Embodiment

Figure 17A:
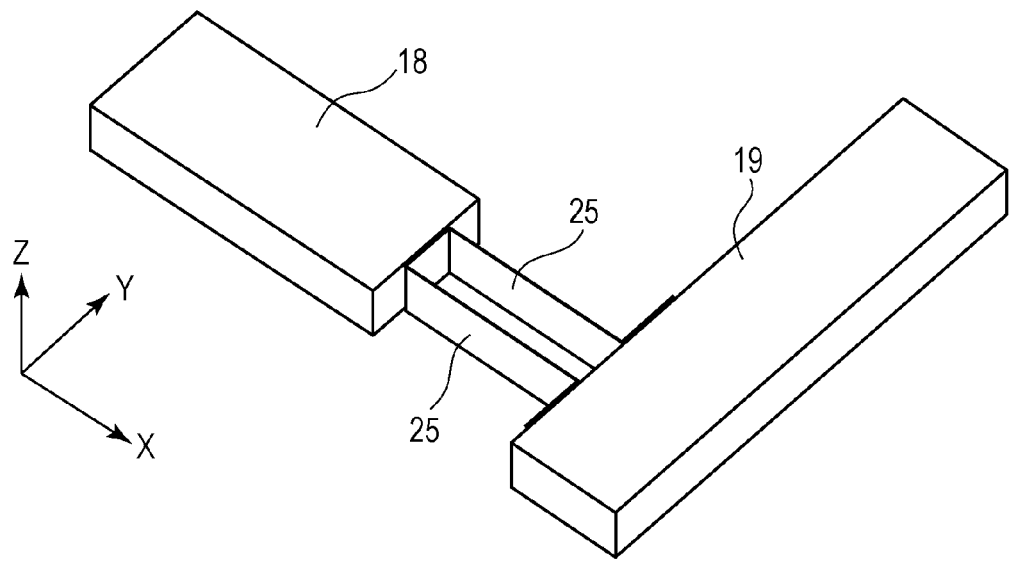
FIG. 17A is a perspective view of the moving mechanisms, part of the movable body, and the driven body.
Figure 17B:
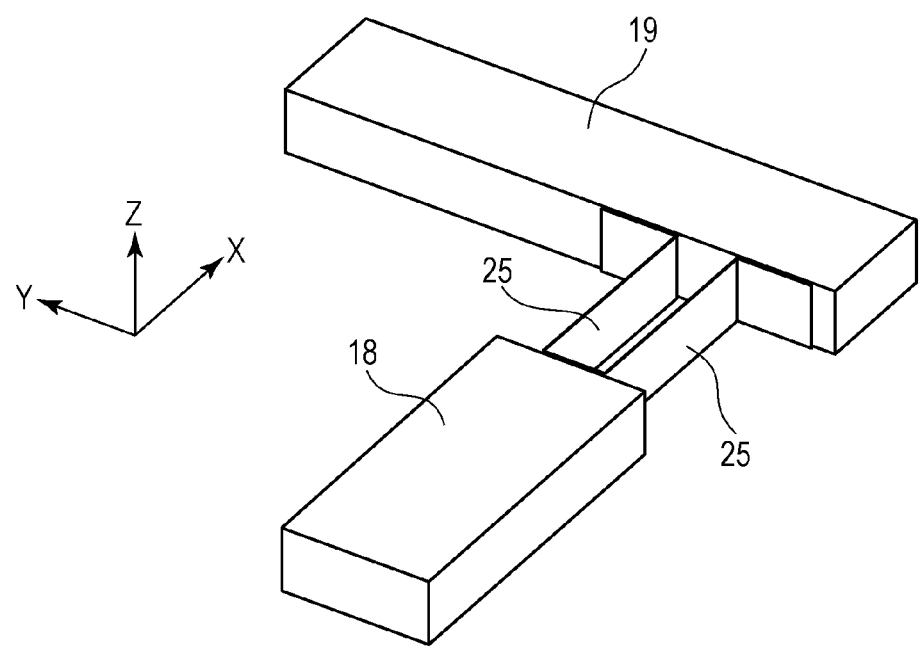
FIG. 17B is a perspective view of the moving mechanisms, part of the movable body, and the driven body.

The difference between a sixth embodiment and the fifth embodiment is the configuration of the moving mechanism 25. FIGS. 17A and 17B are perspective views of the moving mechanisms 25, part of the movable body 19, and the driven body 18. FIGS. 17A and 17B differ in the direction of view. The X-direction in FIGS. 17A and 17B is the driving direction (the first direction) of the vibration type driving apparatus 24. The Y-direction is the deflecting direction (the second direction) in which the movable body 19 and the driven body 18 can be moved relative to each other by the moving mechanism 25.

Although, in the fifth embodiment, two elastic members are arranged side by side in the X-direction (the driving direction, or the first direction), the sixth embodiment is configured such that the elastic members are arranged side by side in the Y-direction (the deflecting direction, or the second direction).

With this configuration, the moving mechanism 25 functions as a flexible linkage whose main deforming direction is the Y-direction (the deflecting direction, or the second direction). When the movable body 19 moves in the Y-direction (the deflecting direction, or the second direction), a force about the Z-axis that the driven body 18 receives is extremely small. This stabilizes the relative positions of the vibrator 8 and the driven body 18 about the Z-axis, thus providing an advantage for stabilizing the performance, as in the fifth embodiment.

In the case of the fourth embodiment, as the relative displacement of the driven body 18 and the movable body 19 in the Y-direction (the deflecting direction, or the second direction) increases, the elastic member is drawn in the longitudinal direction. Since both ends of the elastic member is fixedly restrained in the longitudinal direction and has high rigidity in the longitudinal direction, the rigidity in the Y-direction (the deflecting direction, or the second direction) rapidly increases. This is a so-called nonlinear phenomenon. When this rigidity increases, the reactive force when the elastic member is deformed increases when the driven body 18 and the movable body 19 move relative to each other in the Y-direction (the deflecting direction, or the second direction). This reactive force acts on the movable body 19, increasing the load. This therefore limits the practical relative displacement of the driven body 18 and the movable body 19 in the Y-direction (the deflecting direction, or the second direction) to a small amount.

On the other hand, in the sixth embodiment, both ends of the elastic members are not restrained, so that the ends connected to the driven body 18 can be displaced in the X-direction. Therefore, a rapid increase in rigidity due to the nonlinear shape, as in the fourth embodiment, does not occur. This allows the practical relative displacement of the driven body 18 and the movable body 19 in the Y-direction (the deflecting direction, or the second direction) to be increased.

Seventh Embodiment

Figure 18:
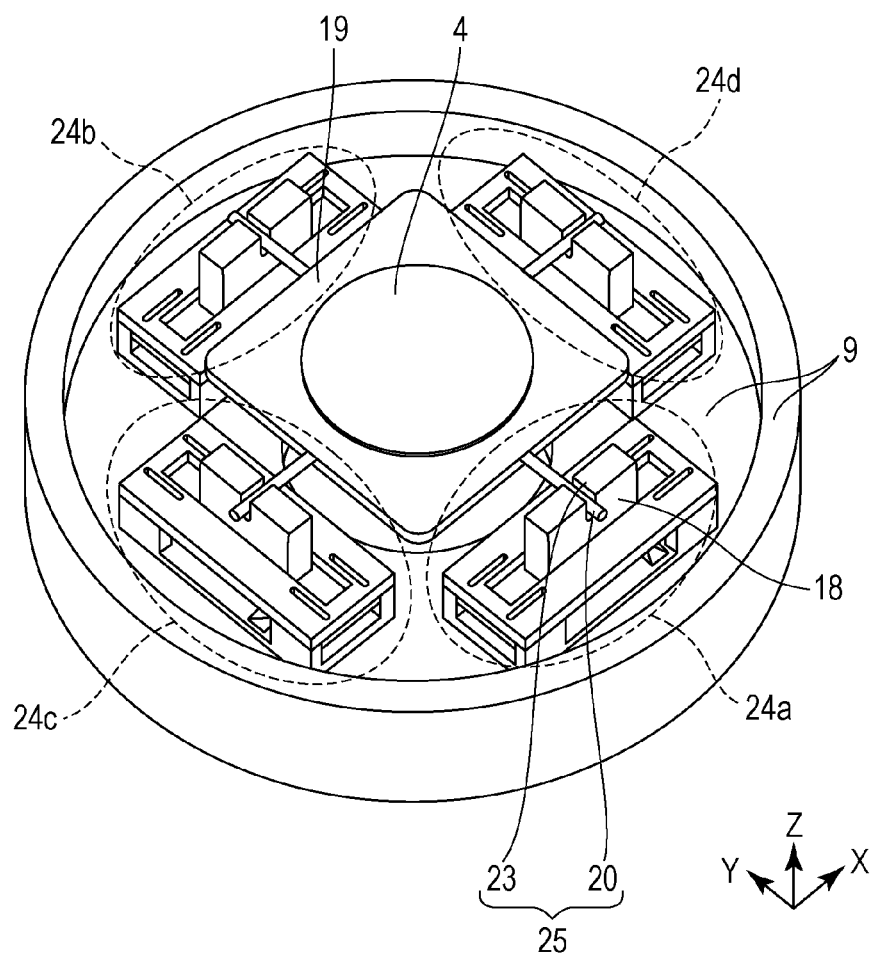
FIG. 18 is a perspective view of an image-blur correction apparatus.

FIG. 18 is a perspective view of an image-blur correction apparatus according to a seventh embodiment of the present invention. The optical lens 4 is attached to the movable body 19. The movable body 19 has four round-bar-shaped guide members 20. The individual guide members 20 extend from the center of the movable body 19 in the X-direction and the Y-direction in FIG. 18. Four vibration type driving apparatuses 24 (24a, 24b, 24c, and 24d) including the movable body 19 and the guide members 20 are provided. The four vibration type driving apparatuses 24 (24a, 24b, 24c, and 24d) share the movable body 19. The individual vibration type driving apparatuses 24 (24a, 24b, 24c, and 24d) are fixed to the lens barrel 9.

The driving direction (the first direction) of the vibration type driving apparatuses 24a and 24b are the X-direction in FIG. 18. The driving direction (the first direction) of the vibration type driving apparatuses 24c and 24d is the Y-direction. By combining the drives of the four vibration type driving apparatuses 24 (24a, 24b, 24c, and 24d), a two-dimensional driving apparatus capable of two-dimensional driving (X-direction, Y-direction, and about the Z-axis) of the movable body 19 is provided. In addition to that, the optical lens 4, the acceleration sensor, the encoder, and the control unit for correcting an image blur are provided to configure an image-blur correction apparatus.

Here, the configuration of the vibration type driving apparatus 24 will be described.

Figure 19A:
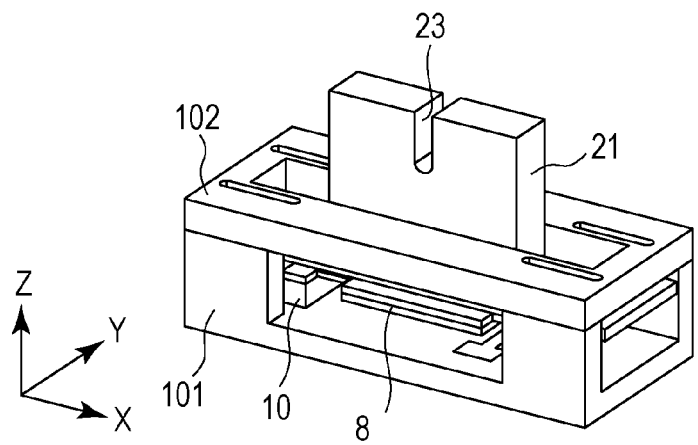
FIG. 19A is a perspective view of a vibration type driving apparatus.
Figure 19B:
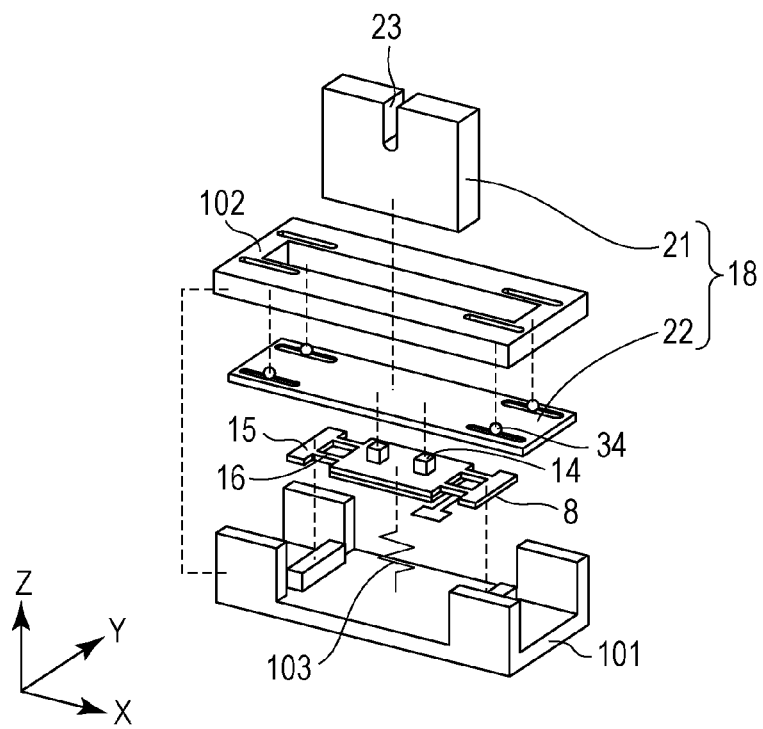
FIG. 19B is a developed view of the vibration type driving apparatus.

FIGS. 19A and 19B are perspective views of the vibration type driving apparatus 24. FIG. 19B shows the assembly configuration of the components, in which the individual components are developed in the Z-direction. Reference sign 101 denotes a unit base; 103 denotes a spring; 8 denotes a vibrator; 22 denotes an abrasion-resistant member; 34 denotes a ceramic ball; 21 denotes a driven-body main body;

and 102 denotes a unit top. The unit base 101 and the unit top 102 are fixed together with screws (not shown) and fix the positions of the other components in the Z-direction.

The vibrator 8 is the same as that in the first embodiment. The driving direction (the first direction) is the X-direction in FIGS. 19A and 19B. The vibrator fixing portions 15 are fixed to the unit base 101.

The surface of the abrasion-resistant member 22 is subjected to nitriding to increase the abrasion resistance. The abrasion-resistant member 22 and the driven-body main body 21 are joined together by bonding to constitute the driven body 18.

The spring 103 is provided between the unit base 101 and the vibrator 8 and has a function of bringing the vibrator 8 into pressure-contact with the abrasion-resistant member 22. The pressure contact force F1 of the upper surfaces of the projecting portions 14 of the vibrator 8 and the abrasion-resistant member 22 is expressed as F0−K*delta z, where F0 is the pressing force of the spring 103, K is the rigidity of the upper surfaces of the projecting portions 14 in the Z-direction in FIG. 19B to the vibrator fixing portions 15, and delta z is a displacement due to deformation. Delta z depends on the relative positions of the components after assembly and is significantly affected by a component error. Therefore, changes in pressure contact force F1 is reduced by setting K small. For this vibrator 8, K is set small by providing the vibrator support beams 16, which is small in cross-sectional area in the Y-Z plane and long in the X-direction, between the vibrator fixing portions 15 and the projections 14. Thus, the pressure contact force F1 is substantially composed of the pressure force F0 of the spring 103.

The operation of the vibrator 8 is the same as that in the first embodiment. The upper surfaces of the projecting portions 14 can be moved in an elliptic orbit in a plane parallel to the X-Y plane in FIGS. 19A and 19B. This allows the abrasion-resistant member 22 that is in pressure-contact with the upper surfaces of the projecting portions 14 and the driven-body main body 21 to be driven in the X-direction.

The abrasion-resistant member 22 has four grooves, with which four ceramic balls 34 are in contact. The two grooves closer to the viewer in the Y-direction have a V-shape extending in the X-direction. The two grooves farther to the viewer in the Y-direction have a concave-shape extending in the X-direction. The unit top 102 also has four grooves, with which the four ceramic balls 34 are in contact. The four grooves have a V-shape extending in the X-direction. The abrasion-resistant member 22, the ceramic balls 34, and the unit top 102 are brought into pressure-contact with each other in the Z-direction by the spring 103. The pressure-contact force is F1, described above. This configuration allows the ceramic balls 34 to roll in the X-direction and prevents the ceramic balls 34 from moving in directions including the Y-direction, other than the X-direction. Thus, the driven body 18 constitutes a limiting mechanism 26 whose amount of movement in the Y-direction relative to the unit top 102 is limited. The advantage of this configuration is the same as that of the limiting mechanism 26 described in the first embodiment.

Here, the configuration of the moving mechanism 25, which is a feature of the present invention, will be described.

The driven-body main body 21 shown in FIGS. 19A and 10B has a driven-body transmitting portion 23. The driven-body transmitting portion 23 has two flat surfaces parallel to the Y-Z plane in FIGS. 19A and 19B. The guide member 20 shown in FIG. 18 is inserted therein.

They constitute the moving mechanism 25, which can perform relative movement in the Y-direction (the deflecting direction, or the second direction). The contact surface of the moving mechanism 25 is coated with lubricant, so that it is under substantially no sliding load. Furthermore, there is no restraint on the relative position in the Z-direction due to this mechanism.

This configuration has the advantages described in the first embodiment. The individual vibration type driving apparatuses 24 can transmit a displacement and a force in the driving direction (the first direction) to the movable body 19. The individual vibration type driving apparatuses 24 can move the movable body 19 and the driven body 18 relative to each other in the deflecting direction (the second direction) intersecting (here, at right angles) the driving direction (the first direction) in a plane parallel to a plane where the vibrator 8 and the driven body 18 are in contact with each other. This prevents generation of a load that hinders movement of the movable body 19 from moving in the deflecting direction (the second direction) of each of the vibration type driving apparatuses 24 (24a, 24b, 24c, and 24d). Furthermore, the vibrator 8 and the driven body 18 can stand still in the deflecting direction (the second direction).

In addition to the advantages described in the first embodiment, the following advantage can be provided. The relative positions in the Z-direction of the guide member 20 and the driven-body transmitting portion 23 sometimes have a deviation due to an error in part accuracy or a mounting error. Since there is no restraint on the relative positions in the Z-direction due to this mechanism, no unnecessary restraint in the Z-direction occurs.

Eighth Embodiment

The difference between an eighth embodiment and the seventh embodiment is the configuration of the driven-body main body 21. This difference will be described.

Figure 20:
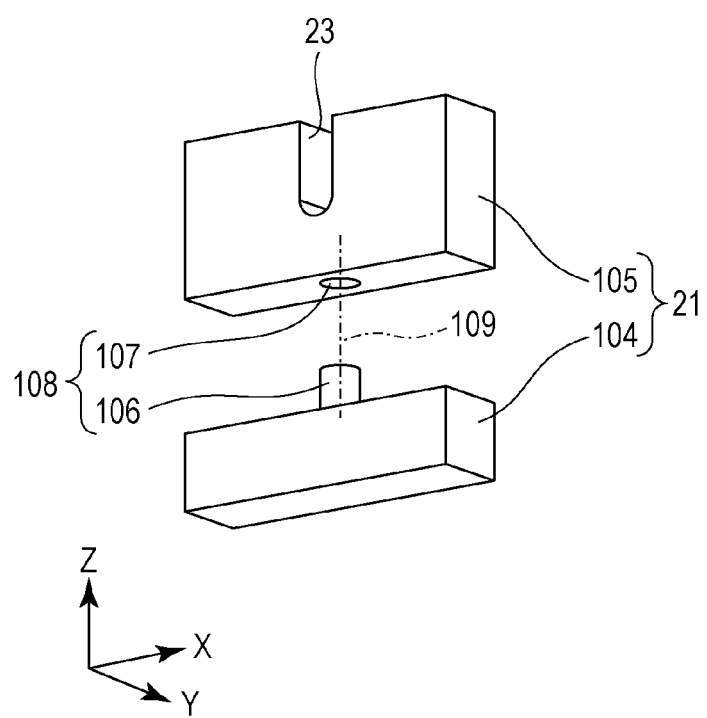
FIG. 20 is a perspective view of a driven-body main body.

FIG. 20 is a perspective view of the driven-body main body 21. The X-direction is the driving direction (the first direction) of the vibration type driving apparatus 24. The Y-direction is the deflecting direction (the second direction). The Z-direction is the contact direction of the vibrator 8 and the driven body 18. The parts are developed in the Z-direction.

A driven-body-main-body lower portion 104 and a driven-body-main-body upper portion 105 constitute the driven-body main body 21.

The lower surface of the driven-body-main-body lower portion 104 in FIG. 20 is fixed to the abrasion-resistant member 22. The driven-body-main-body lower portion 104 has a round-bar-shaped shaft 106. A center axis 109 of the shaft 106 is parallel to the Z-direction. The surface of the shaft 106 is provided with a hard film and is coated with lubricant. The driven-body-main-body upper portion 105 has the driven-body transmitting portion 23 and a round hole 107, which function as part of the moving mechanism 25. The guide member 20 is placed in the driven-body transmitting portion 23. The center axis of the round hole 107 is aligned with the center axis 109 of the shaft 106 of the driven-body-main-body lower portion 104. The surface of the round hole 107 is provided with a hard film and is coated with lubricant.

The driven-body-main-body lower portion 104 and the driven-body-main-body upper portion 105 are joined together by inserting the shaft 106 into the round hole 107. The round hole 107 and the shaft 106 constitute a rotation mechanism 108. The rotation axis (first axis) thereof is the center axis 109, which is intersecting (approximately perpendicular to) a plane where the vibrator 8 and the driven body 18 are in contact with each other.

This rotation mechanism 108 allows the driven body 18 and the movable body 19 to rotate relative to each other about the first axis.

The rotating operation of the two-dimensional driving apparatus by means of the rotation mechanism 108 will be described hereinbelow.

Figure 21:
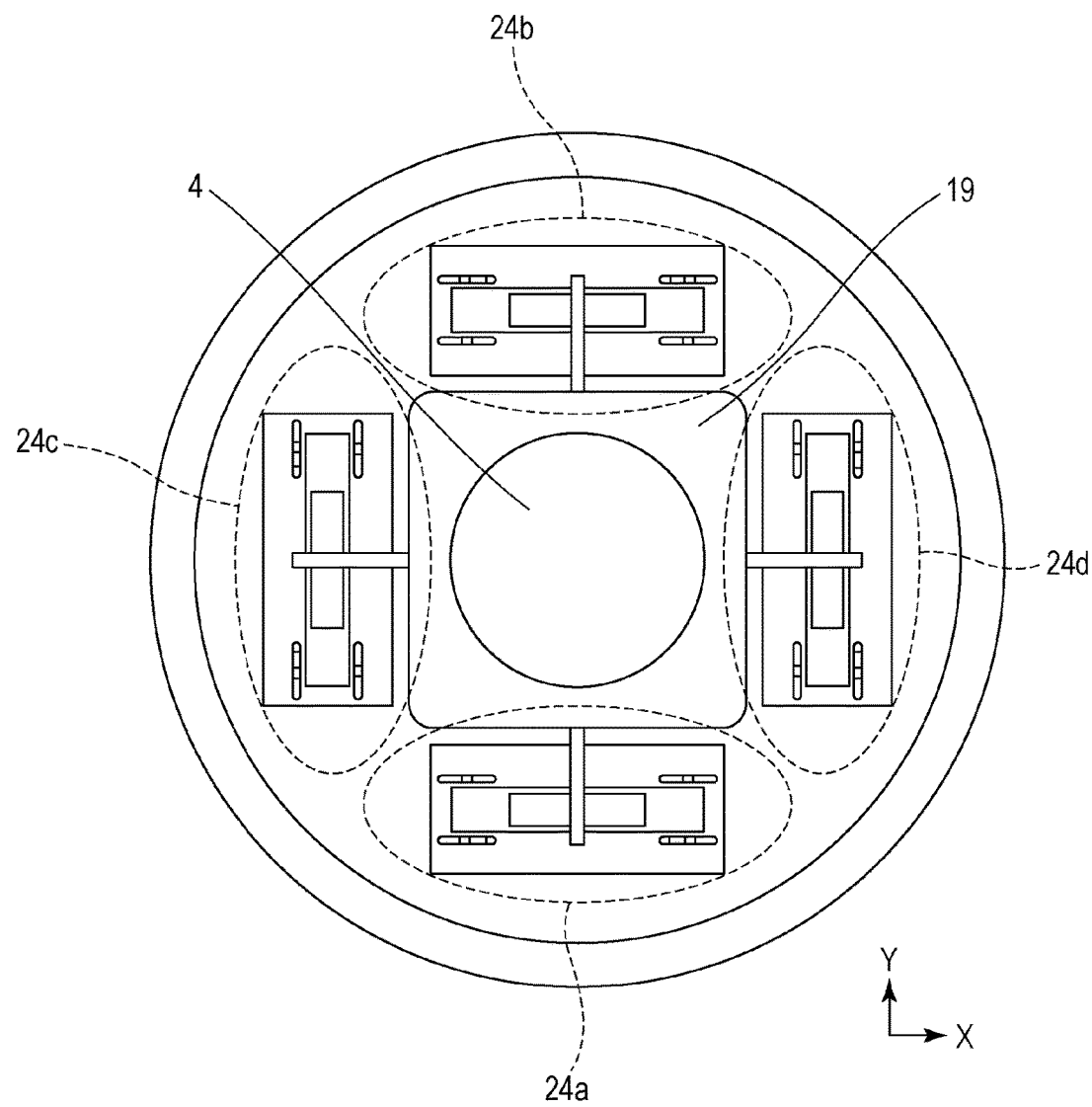
FIG. 21 is a front view of an image-blur correction apparatus.
Figure 22:
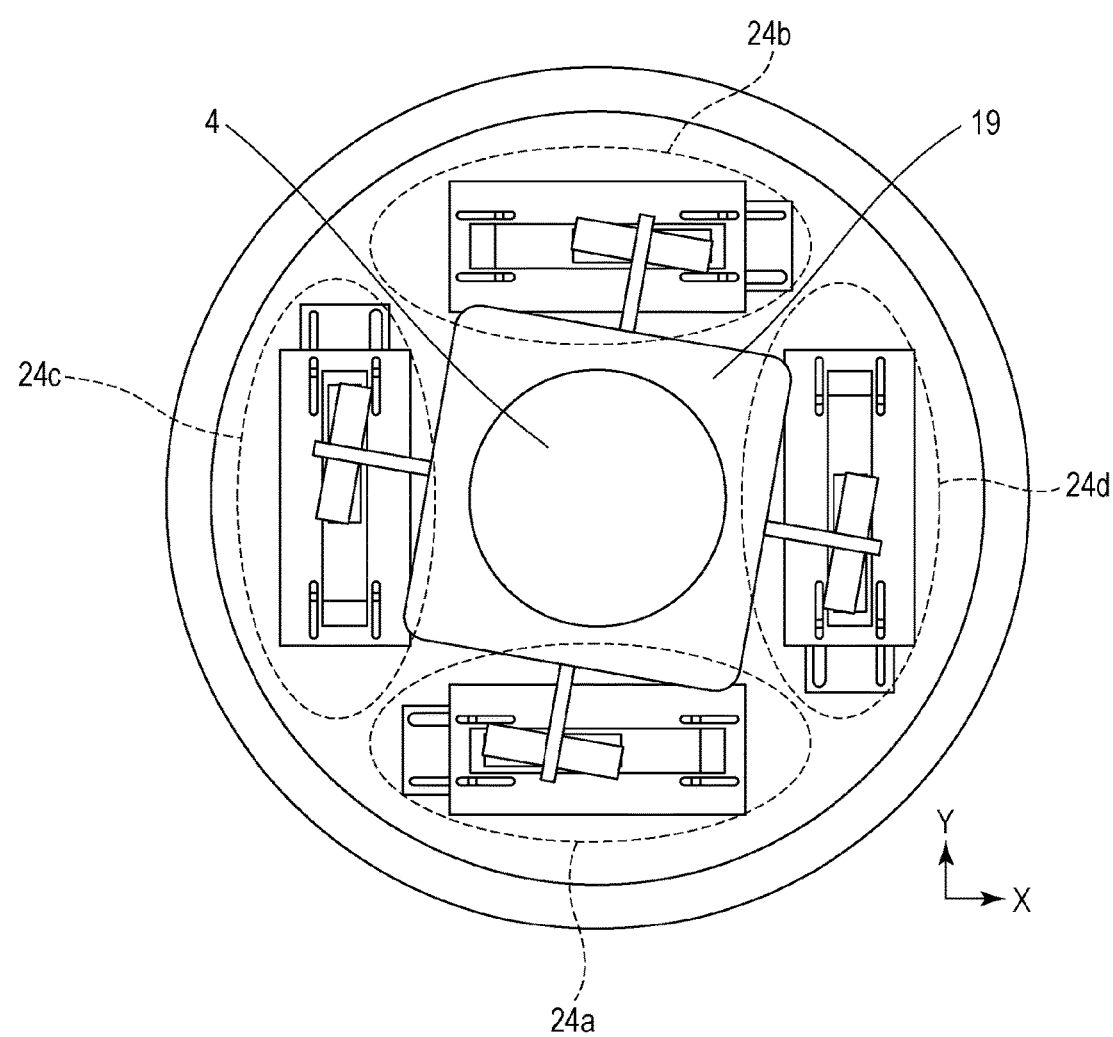
FIG. 22 is a front view of the image-blur correction apparatus.

FIG. 21 is a front view of the image-blur correction apparatus. The origin of the coordinate system in FIG. 21 is aligned with the central position of the outer circumference of the lens barrel 1. The vibration type driving apparatus 24a is caused to generate a driving force in a negative X-direction. The vibration type driving apparatus 24b is caused to generate a driving force in a positive X-direction. The vibration type driving apparatus 24c is caused to generate a driving force in a positive Y-direction. The vibration type driving apparatus 24d is caused to generate a driving force in a negative Y-direction. In other words, a driving force in a clockwise direction in the plane of FIG. 21 is generated. This operation allows the movable body 19 to be moved clockwise, as shown in FIG. 22. At this time, the driven-body-main-body upper portion 105 is also rotated clockwise by the rotation mechanism 108, so that the driven-body transmitting portion 23 can maintain the state in which it is along the guide member 20. If the rotation mechanism 108 is not provided, the relative rotation of the driven-body transmitting portion 23 and the guide members 20 is retrained, and thus, the amount of rotating operation of the movable body 19 is decreased.

Ninth Embodiment

The difference between a ninth embodiment and the eighth embodiment is the configuration of the rotation mechanism 108.

Figure 23A:
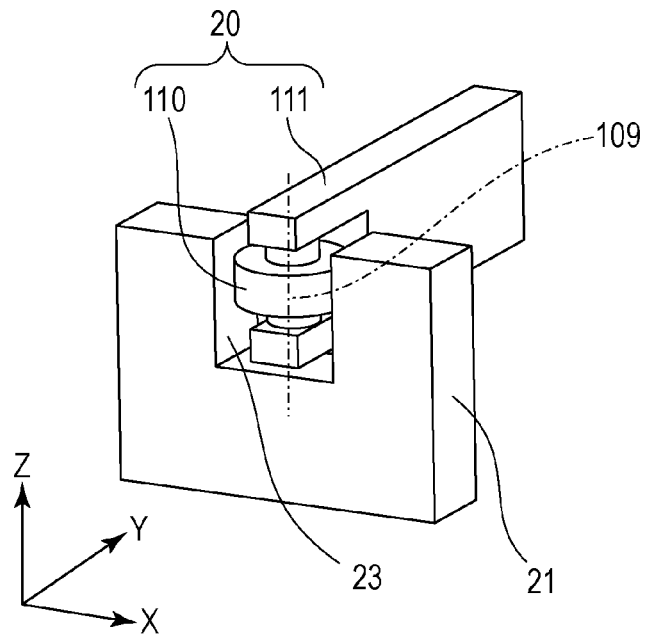
FIG. 23A is a perspective view of a rotation mechanism.
Figure 23B:
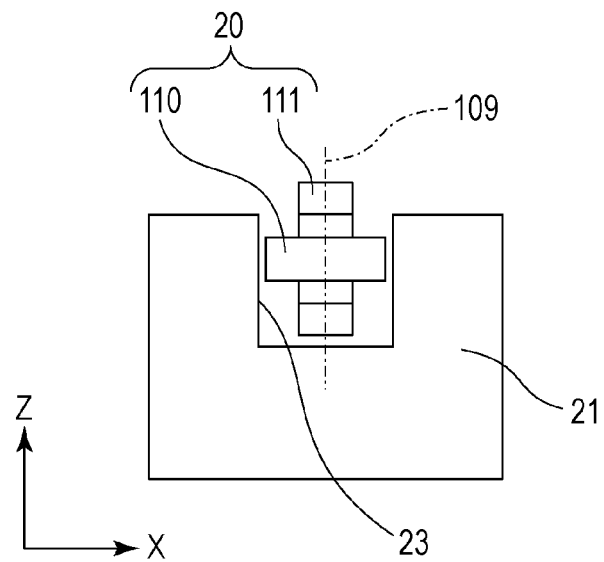
FIG. 23B is a front view of the rotation mechanism.
Figure 23C:
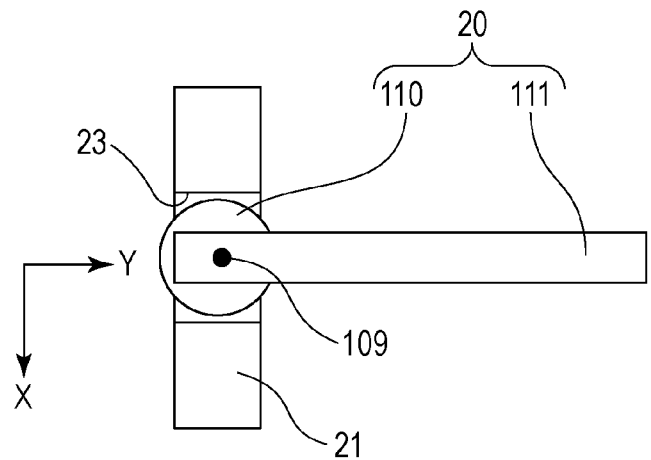
FIG. 23C is a top view of the rotation mechanism.
Figure 23D:
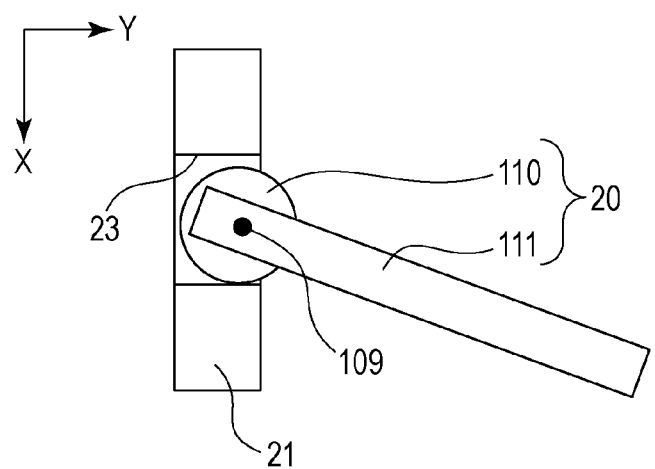
FIG. 23D is a top view of the rotation mechanism.

FIGS. 23A to 23D are diagrams of the rotation mechanism 108. FIG. 23A is a perspective view thereof. FIG. 23B is a front view thereof. FIGS. 23C and 23D are top views thereof.

The driven-body main body 21 has two flat driven-body transmitting portions 23. The guide member 20 is constituted by a rotating member 110, which is a ball bearing, and a guide-member main body 111. In the ninth embodiment, the rotating member 110 serves as the rotation mechanism 108. The inner ring of the rotating member 110 is fixed to the guide-member main body 111. The rotation center of the rotating member 110 is the center axis 109. The outside diameter of the rotating member 110 is slightly smaller than the distance between the two driven-body transmitting portions 23, so that the rotating member 110 and the driven-body transmitting portions 23 have a clearance therebetween in the X-direction. Both the driven-body transmitting portions 23 and the surface of the outer ring of the rotating member 110 are not coated with lubricant.

Here, the deflecting operation will be described.

When the movable body 19 moves in the Y-direction (the deflecting direction, or the second direction) in FIGS. 23A to 23D, the rotating member 110 can roll, with the outer ring in contact with one of the driven-body transmitting portions 23, because the outer ring has a rollable curved portion. Since the rolling resistance is extremely smaller than sliding resistance, and the rolling resistance of the ball bearing is extremely small, the resistance in the deflecting operation can be substantially zero even without lubricant.

Here, the operation of the rotation mechanism 108 will be described.

FIG. 23D shows the operation of the rotation mechanism 108 of the vibration type driving apparatus 24a when, as shown in FIG. 22, the movable body 19 rotates clockwise in the plane of FIG. 22. The driven-body main body 21 is driven in the negative X-direction. At that time, the flat surface of the driven-body transmitting portion 23 at the positive X-direction side of the flat surfaces of the two driven-body transmitting portions 23 comes into contact with the rotating member 110. The rotating member 110 is moved in the negative X-direction as the driven-body main body 21 is driven. Since the rotating member 110 can rotate about the rotation center (the rotation axis 109), the guide-member main body 111 can rotate clockwise about the center of the movable body 19 (at the right in the plane of the drawing). At that time, the rotating member 110 moves slightly in the positive Y-direction relative to the driven-body main body 21.

In the ninth embodiment, by aligning the rotation center of the member having a rollable curved portion of the moving mechanism 25 with the rotation center of the rotation mechanism 108, the functions thereof can be achieved by the single rotating member 110. This allows the configuration to be simplified.

Here, other configurations of the rotation mechanism 108 will be described.

Figure 24A:
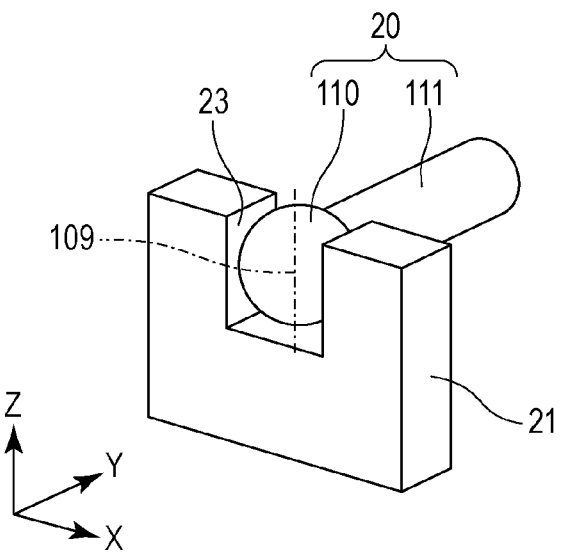
FIG. 24A is a perspective view of another rotation mechanism.
Figure 24B:
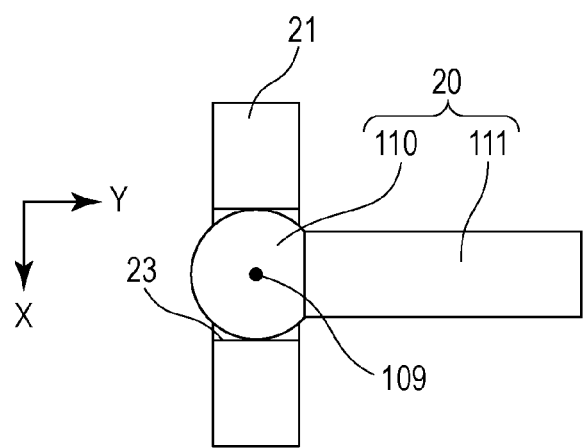
FIG. 24B is a top view of the rotation mechanism.

FIGS. 24A and 24B are diagrams of a first configuration of the rotation mechanism. FIG. 24A is a perspective view thereof. FIG. 24B is a top view thereof. The rotating member 110 has a spherical shape. The center of the sphere is located on the rotation axis 109. The rotating member 110 and the guide-member main body 111 constitute the guide member 20. The flat surfaces of the driven-body transmitting portions 23 of the driven-body main body 21 and the surface of the rotating member 110 are in contact with each other, which constitute the moving mechanism 25 and the rotation mechanism 108. The contact surfaces are coated with lubricant. When the movable body 19 is moved in the Y-direction in FIGS. 24A and 24B, the driven-body main body 21 and the guide members 20 can be moved relative to each other in the Y-direction (the deflecting direction, or the second direction). At this time, the contact surfaces slide. However, since the contact surfaces are coated with lubricant, its sliding resistance is small.

Furthermore, when the movable body 19 is rotationally moved, the driven-body main body 21 and the guide member 20 can rotate relative to each other about the rotation axis 109. In other words, the movable body 19 has a rotation mechanism that can rotate relative to the driven body 18. During the rotating motion, the contact surfaces slide. However, since the contact surfaces are coated with lubricant, its sliding resistance is small.

Figure 25A:
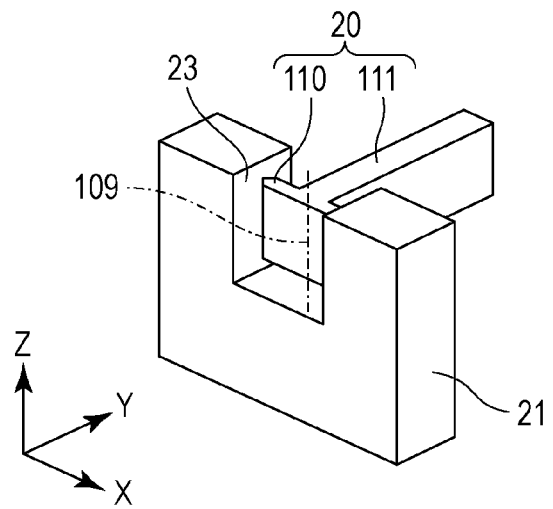
FIG. 25A is a perspective view of another rotation mechanism.
Figure 25B:
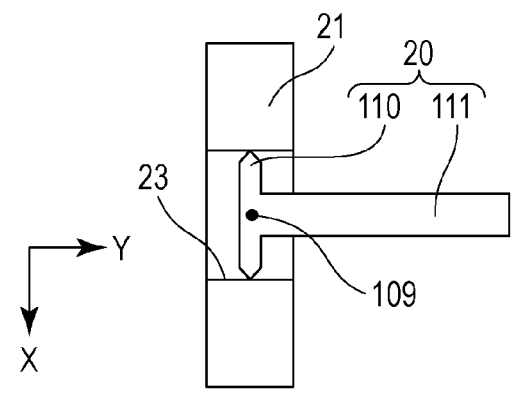
FIG. 25B is a top view of the rotation mechanism.

FIGS. 25A and 25B are diagrams of a second configuration of the rotation mechanism. FIG. 25A is a perspective view thereof. FIG. 25B is a top view thereof. The ends of the rotating member 110 which are in contact with the flat surfaces of the driven-body transmitting portions 23 have an acute-angled shape. Also with this shape, when the movable body 19 is rotationally moved, the driven-body main body 21 and the guide member 20 can rotate relative to each other about the rotation axis 109. In other words, the movable body 19 serves as a rotation mechanism that can rotate relative to the driven body 18.

Figure 26A:
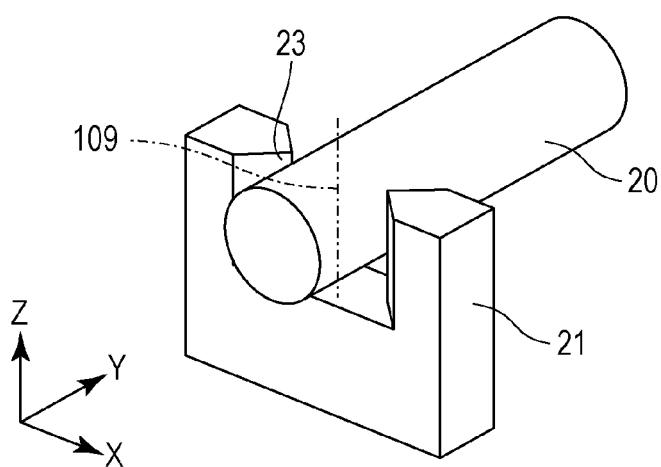
FIG. 26A is a perspective view of another rotation mechanism.
Figure 26B:
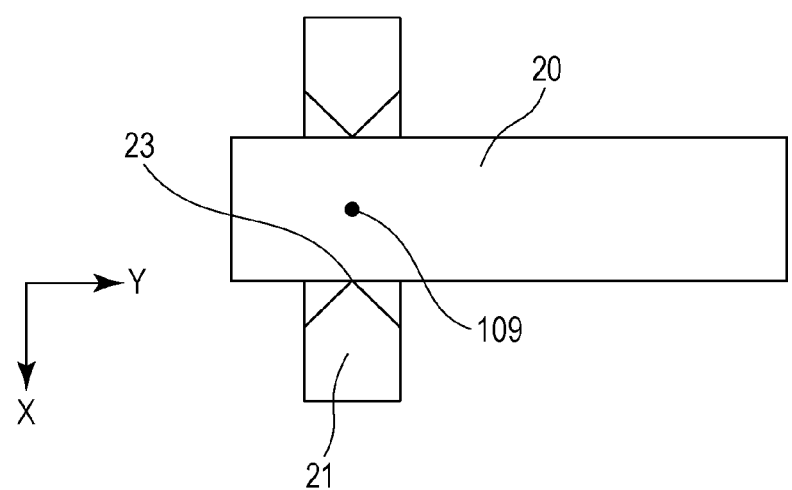
FIG. 26B is a top view of the rotation mechanism.

FIGS. 26A and 26B are diagrams of a third configuration of the rotation mechanism. FIG. 26A is a perspective view thereof. FIG. 26B is a top view thereof. The ends of portions of the driven-body transmitting portions 23 in contact with the guide member 20 have an acute-angled shape. The guide member 20 has a round bar shape. Also with such a combination of shapes, when the movable body 19 is rotationally moved, the driven-body main body 21 and the guide member 20 can rotate relative to each other about the rotation axis 109. In other words, the movable body 19 serves as a rotation mechanism that can rotate relative to the driven body 18.

Figure 27A:
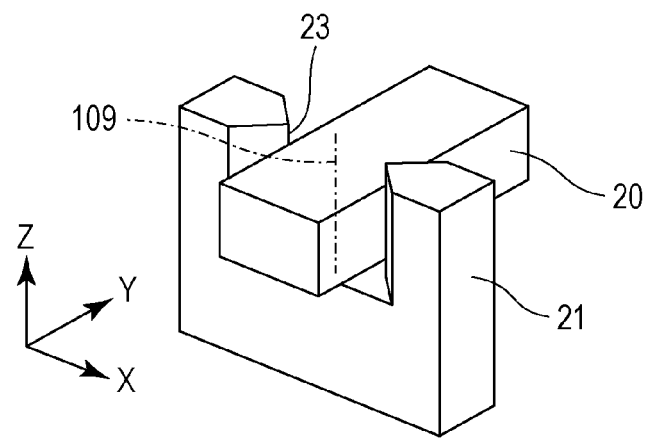
FIG. 27A is a perspective view of another rotation mechanism.
Figure 27B:
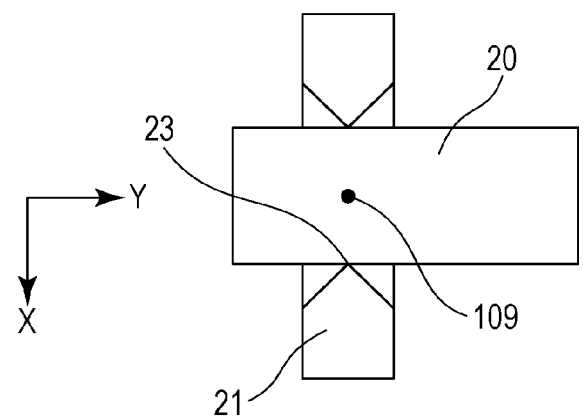
FIG. 27B is a top view of the rotation mechanism.

FIGS. 27A and 27B are diagrams of a fourth configuration of the rotation mechanism. FIG. 27A is a perspective view thereof. FIG. 27B is a top view thereof. The difference between the configuration and the third configuration of the rotation mechanism is that the guide member 20 has a square-bar shape. Also with such a combination, when the movable body 19 is rotationally moved, the driven-body main body 21 and the guide member 20 can rotate relative to each other about the rotation axis 109. In other words, the movable body 19 serves as a rotation mechanism that can rotate relative to the driven body 18.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-128283 filed Jun. 5, 2012 and No. 2013-084115 filed Apr. 12, 2013, which are hereby incorporated by reference herein in their entirety.

REFERENCE SIGNS LIST 8 vibrator
18 driven body
19 movable body
24 vibration type driving apparatus
25 moving mechanism

The invention claimed is:

1. A two-dimensional driving apparatus comprising:
a common movable body;
    a first vibrator including an electro-mechanical energy conversion device, the first vibrator being configured to move the common movable body in a first direction;
    a second vibrator including an electro-mechanical energy conversion device, the second vibrator being configured to move the common movable body in a second direction intersecting the first direction;
    a first driving force transmission unit configured to transmit a driving force of the first vibrator to the common movable body and move with the common movable body in the first direction; and
    a second driving force transmission unit configured to transmit a driving force of the second vibrator to the common movable body and move with the common movable body in the second direction,
    wherein the common movable body is slidable with respect the first driving force transmission unit in the second direction and the common movable body is also slidable with respect the second driving force transmission unit in the first direction,
    wherein the first vibrator and the first driving force transmission unit do not move in the second direction when the second driving force transmission unit and the common movable body are moved in the second direction due to the driving force of the second vibrator, and the second vibrator and the second driving force transmission unit do not move in the first direction when the first driving force transmission unit and the common movable body are moved in the first direction due to the driving force of the first vibrator, and
    wherein the first vibrator and the second vibrator maintain a same positional relation to each other.

2. The two-dimensional driving apparatus according to claim 1, wherein the first driving force transmission unit includes a guide member capable of moving in the second direction.

3. The two-dimensional driving apparatus according to claim 1, wherein the first driving force transmission unit includes a round-bar-shaped guide member whose axis extends in the second direction and an opening which is provided in a driven body and whose axis extends in the second direction.

4. The two-dimensional driving apparatus according to claim 1, wherein the first driving force transmission unit includes a guide member that can move in the second direction and a member having a rollable curved portion.

5. The two-dimensional driving apparatus according to claim 4, wherein the rollable curved portion has a spherical or cylindrical shape.

6. The two-dimensional driving apparatus according to claim 1, wherein the first driving force transmission unit includes a moving member.

7. The two-dimensional driving apparatus according to claim 6, wherein the rigidity of the moving member in the second direction is lower than the rigidity of the moving member in the first direction.

8. The two-dimensional driving apparatus according to claim 6, wherein the moving member includes a plate-like moving member.

9. The two-dimensional driving apparatus according to claim 8, wherein the first driving force transmission unit is configured such that a plurality of the plate-like moving members are arranged side by side in the first direction.

10. The two-dimensional driving apparatus according to claim 1, wherein the first driving force transmission unit is configured such that a plurality of the plate-like moving members are arranged side by side in the second direction.

11. The two-dimensional driving apparatus according to claim 1, further comprising a limiting mechanism that limits the amount of relative movement of the first vibrator and the common movable body in the second direction.

12. The two-dimensional driving apparatus according to claim 2, further comprising two limiting mechanisms,
    wherein each of the two limiting mechanisms is configured to limit the amount of relative movement of the first vibrator and a first driven body in the second direction, and
    wherein the two limiting mechanisms are disposed so as to hold the first driven body therebetween.

13. The two-dimensional driving apparatus according to claim 1, further comprising a rotation mechanism that can rotate the common movable body about a first axis relative to the first vibrator,
    wherein the first axis extends in a direction intersecting the plane where the first direction and the second direction intersect with each other.

14. The two-dimensional driving apparatus according to claim 13,
    wherein the first moving mechanism includes a guide member that can move in the second direction and a member having a rollable curved portion,
    wherein the rotation center of the member having the rollable curved portion during rolling substantially coincides with the rotation center of the rotation mechanism.

15. An image-blur correction apparatus comprising:
the two-dimensional driving apparatus according to claim 1; and
an optical lens or an image pickup element mounted to the common movable body of the two-dimensional driving apparatus.

16. An interchangeable lens comprising:
the two-dimensional driving apparatus according to claim 1; and
an optical lens mounted to the common movable body of the two-dimensional driving apparatus.

17. An image pickup apparatus comprising:
the two-dimensional driving apparatus according to claim 1;
an optical lens or an image pickup element mounted to the common movable body of the two-dimensional driving apparatus; and
a power source.

18. An automatic stage comprising the two-dimensional driving apparatus according to claim 1, wherein an observation-target mount portion is mounted to the common movable body of two-dimensional driving apparatus.

19. The two-dimensional driving apparatus according to claim 1, further comprising a first driven body,
wherein the common movable body is configured to be moved in the first direction by the first vibrator via the first driven body.

20. The two-dimensional driving apparatus according to claim 19, further comprising a second driven body,
wherein the common movable body is configured to be moved in the second direction by the second vibrator via the second driven body.

* * * * *